US011917708B2

(12) United States Patent
Jeong et al.

(10) Patent No.: US 11,917,708 B2
(45) Date of Patent: Feb. 27, 2024

(54) METHOD AND APPARATUS FOR SUPPORTING MULTIPLE CONNECTIONS IN WIRELESS LAN SYSTEM

(71) Applicant: Samsung Electronics Co., Ltd., Suwon-si (KR)

(72) Inventors: Sangsoo Jeong, Suwon-si (KR); Songyean Cho, Seoul (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 17/113,423

(22) Filed: Dec. 7, 2020

(65) Prior Publication Data

US 2021/0092791 A1 Mar. 25, 2021

Related U.S. Application Data

(63) Continuation of application No. 14/654,244, filed as application No. PCT/KR2014/008104 on Aug. 29, 2014, now Pat. No. 10,863,572.

(30) Foreign Application Priority Data

Aug. 30, 2013 (KR) .......................... 10-2013-0104058
Mar. 7, 2014 (KR) .......................... 10-2014-0027080

(51) Int. Cl.
*H04W 76/22* (2018.01)
*H04W 28/02* (2009.01)
(Continued)

(52) U.S. Cl.
CPC ............. *H04W 76/22* (2018.02); *H04W 8/04* (2013.01); *H04W 28/0215* (2013.01);
(Continued)

(58) Field of Classification Search
None
See application file for complete search history.

(56) References Cited

U.S. PATENT DOCUMENTS 8,948,750 B1 * 2/2015 Carames ................. H04W 8/12
455/433
9,583,917 B2 2/2017 Peter
(Continued)

FOREIGN PATENT DOCUMENTS

CN 102792739 A 11/2012
CN 103002511 A 3/2013
(Continued)

OTHER PUBLICATIONS

Chinese Office Action dated Dec. 3, 2018, issued in Chinese Application No. 201480006039.2.
(Continued)

*Primary Examiner* — Adnan Baig
(74) *Attorney, Agent, or Firm* — Jefferson IP Law, LLP

(57) ABSTRACT

Disclosed is a method of transmitting/receiving a signal in a Mobile Management Entity (MME) of a mobile communication system, the method comprising: transmitting a subscriber information request message including information of a UE, to a Home Subscriber Server (HSS); receiving, from the HSS, a response message which corresponds to the request message and includes an indicator indicating whether it is possible to perform traffic offloading using a Wireless Local Area Network (WLAN) with regard to an Access Point Name (APN) connection or a Packet Data Network (PDN) connection of the UE; determining whether it is possible to perform the traffic offloading using the WLAN, on the basis of at least one of information included in the received response message and information configured in the MME; and; and transmitting, to the UE, a message including information on whether it is possible to
(Continued)

perform the traffic offloading using the WLAN. A communication method according to an embodiment of the present specification can generate one or more PDN connections with regard to one APN when the UE accesses a PDN through the WLAN. Further, the communication method according to the present invention can effectively be subjected to a traffic offloading control by the eNB even when the UE is roaming.

12 Claims, 17 Drawing Sheets

(51) Int. Cl.
*H04W 8/04* (2009.01)
*H04W 48/20* (2009.01)
*H04W 84/12* (2009.01)
*H04W 76/16* (2018.01)
*H04W 48/14* (2009.01)

(52) U.S. Cl.
CPC ....... *H04W 28/0226* (2013.01); *H04W 48/20* (2013.01); *H04W 48/14* (2013.01); *H04W 76/16* (2018.02); *H04W 84/12* (2013.01)

(56) References Cited

U.S. PATENT DOCUMENTS

| | | |
|---|---|---|
| 2011/0216743 A1 | 9/2011 | Bachmann et al. |
| 2011/0310799 A1 | 12/2011 | Horn et al. |
| 2012/0023189 A1 | 1/2012 | Giaretta et al. |
| 2012/0063300 A1 | 3/2012 | Sahin et al. |
| 2012/0184266 A1 | 7/2012 | Faccin et al. |
| 2012/0189016 A1 | 7/2012 | Bakker et al. |
| 2012/0195299 A1 | 8/2012 | Liang et al. |
| 2012/0257598 A1* | 10/2012 | Karampatsis ......... H04W 8/082 370/331 |
| 2013/0089076 A1* | 4/2013 | Olvera-Hernandez ...................... H04W 36/08 370/332 |
| 2013/0142070 A1 | 6/2013 | Matsuto et al. |
| 2014/0082697 A1 | 3/2014 | Watfa et al. |
| 2014/0204909 A1* | 7/2014 | Cheng ................... H04W 8/082 370/331 |
| 2014/0211626 A1 | 7/2014 | Liu |
| 2014/0254576 A1* | 9/2014 | Varma ................... H04W 48/16 370/338 |
| 2014/0307550 A1 | 10/2014 | Forssell et al. |
| 2015/0087318 A1 | 3/2015 | Apelewicz et al. |
| 2015/0139184 A1 | 5/2015 | Wang et al. |
| 2016/0020890 A1 | 1/2016 | Sirotkin et al. |
| 2016/0119776 A1* | 4/2016 | Rasanen ............... H04W 48/17 455/405 |

FOREIGN PATENT DOCUMENTS

| | | |
|---|---|---|
| CN | 103004279 A | 3/2013 |
| CN | 103202064 A | 7/2013 |
| CN | 103428822 A | 12/2013 |
| CN | 104641718 A | 5/2015 |
| GB | 2482449 A | 2/2012 |
| KR | 10-2012-0104622 A | 9/2012 |
| KR | 10-2012-0115396 A | 10/2012 |
| KR | 10-2013-0031928 A | 3/2013 |
| KR | 10-2013-0038087 A | 4/2013 |
| WO | 2012/112571 A1 | 8/2012 |
| WO | WO-2012112571 A1 * | 8/2012 ......... H04L 12/2803 |
| WO | 2013-135467 A1 | 9/2013 |
| WO | 2014/043494 A1 | 3/2014 |

OTHER PUBLICATIONS

Chinese Office Action dated Aug. 12, 2019, issued in a counterpart Chinese Application No. 201480006039.2.
Indian Office Action dated Jun. 12, 2020, issued in a counterpart Indian Application No. 3469/CHENP/2015.
Extended European Search Report dated May 11, 2022, issued in a counterpart European Application No. 21209546.7.
CATT, "UE requested PDN connectivity for the Emergency Session", S2-093405, 3GPP TSG-SA WG2 Meeting #73, Tallin, Estonia, May 15, 2009.
Chinese Office Action dated Mar. 3, 2023, issued in Chinese Patent Application No. 202010419360.0.

* cited by examiner

METHOD AND APPARATUS FOR SUPPORTING MULTIPLE CONNECTIONS IN WIRELESS LAN SYSTEM

CROSS-REFERENCE TO RELATED APPLICATION(S)

This application is a continuation application of prior application Ser. No. 14/654,244, filed on Jun. 19, 2015, which will be issued as U.S. Pat. No. 10,863,572 on Dec. 8, 2020; which is a U.S. National Stage application under 35 U.S.C. § 371 of an International application number PCT/KR2014/008104, filed on Aug. 29, 2014, which is based on and claimed priority of a Korean patent application number 10-2013-0104058, filed on Aug. 30, 2013, and of a Korean patent application number 10-2014-0027080, filed on Mar. 7, 2014, in the Korean Intellectual Property Office, the disclosure of each of which are incorporated by reference herein in its entirities.

TECHNICAL FIELD

The present invention relates to a technology for providing a service of effectively transmitting and receiving data by simultaneously using a 3GPP system and a non-3GPP system in a network in which the 3GPP system and the non-3GPP system coexist. More particularly, the present invention relates to a technology for supporting multiple Packet Data Network (PDN) connections to the same Access Point Name (APN) in an environment in which a wireless LAN is used, and effectively transmitting data in a roaming network.

BACKGROUND ART

In general, a mobile communication system was developed to provide a voice service while guaranteeing activity of a user. However, the mobile communication system has gradually extended its field to the data providing service beyond the voice providing service and has now developed to such a level at which they can provide a high speed data service. Meanwhile, resource shortages have arisen in the mobile communication system providing a service at present, and due to a user's demand for a higher speed service, a more developed mobile communication system is required.

To meet the demand, standardization of Long Term Evolution (LTE) is being progressed by the 3$^{rd}$ Generation Partnership Project (3GPP) as one of next generation mobile communication systems that are being developed. The LTE is a technology of implementing high speed packet based communication with a transmission rate of up to about 100 Mbps. To this end, several methods are being discussed, including a method of reducing the number of nodes located on a communication channel by simplifying a network architecture, a method of making wireless protocols closely access a wireless channel to the maximum, and the like.

In such a mobile communication system, a UE can simultaneously use a plurality of different types of networks. In particular, the UE can simultaneously use a 3GPP access network such as GERAN/UTRAN/E-UTRAN and a non-3GPP access network such as Wireless Local Area Network (WLAN). For example, the UE may access WLAN for different traffic to transmit/receive data while accessing E-UTRAN to transmit/receive data.

In this way, a method and an apparatus for efficiently transmitting/receiving data are required.

DETAILED DESCRIPTION OF THE INVENTION

Technical Problem

When a UE uses a service connected to a specific Packet Data Network (PDN) through the non-3GPP system, a PDN connection should be generated from a UE to a Packet Data Network Gateway (P-GW). In order to increase degrees of freedom of a provider network and a service for a user, the network should make an allowance to generate one or more PDN connections for PDNs having the same Access Point Name (APN) even when one UE performs access using the WLAN. An apparatus and a control method for such a PDN connection are required.

Meanwhile, when the UE roams another provider network, a method and an apparatus for effectively controlling off-loading of traffic through the WLAN by an eNB are required.

Technical Solution

A method of transmitting/receiving a signal in a Mobile Management Entity (MME) of a mobile communication system according to an embodiment of the present specification comprises: transmitting a subscriber information request message including information of a UE, to a Home Subscriber Server (HSS); receiving, from the HSS, a response message which corresponds to the request message and includes an indicator indicating whether it is possible to perform traffic offloading using a Wireless Local Area Network (WLAN) with regard to an Access Point Name (APN) connection or a Packet Data Network (PDN) connection of the UE; determining whether it is possible to perform the traffic offloading using the WLAN, on the basis of at least one of information included in the received response message and information configured in the MME; and; and transmitting, to the UE, a message including information on whether it is possible to perform the traffic offloading using the WLAN.

A method of transmitting/receiving a signal in a UE of a mobile communication system according to another embodiment of the present specification comprises: transmitting a connection request to an MME; receiving, from the MME, a response message which corresponds to the connection request and includes an indicator indicating whether it is possible to perform traffic offloading with regard to an APN connection or a PDN connection of the UE; and determining whether it is possible to perform the traffic offloading, on the basis of at least one of pieces of information included in the response message.

An MME for transmitting/receiving a signal in a mobile communication system according to another embodiment of the present specification comprises: a transmission/reception unit that transmits/receives a signal to/from at least one of a UE, an eNB, and an HSS; and a controller that controls the transmission/reception unit, transmits a subscriber information request message including information of the UE to the HSS, receives, from the HSS, a response message which corresponds to the request message and includes an indicator indicating whether it is possible to perform traffic offloading using a WLAN with regard to an APN connection or a PDN connection of the UE, determines whether it is possible to perform the traffic offloading using the WLAN, on the basis of at least one of information included in the received response message and information configured in the MME, and transmits, to the UE, a message including information on whether it is possible to perform the traffic offloading using the WLAN.

A UE for transmitting/receiving a signal in a mobile communication system according to yet another embodiment of the present specification comprises: a transmission/reception unit that transmits/receives a signal to/from at least one of an eNB and an MME; and a controller that controls the transmission/reception unit, transmits a connection request to the MME, receives, from the MME, a response message which corresponds to the connection request and includes an indicator indicating whether it is possible to perform traffic offloading using a WLAN with regard to a PDN connection of the UE, and determines whether the traffic offloading is performed or not, on the basis of at least one of pieces of information included in the response message.

Advantageous Effects

A communication method according to an embodiment of the present invention generates one or more PDN connections for one APN when a UE access a PDN through the WLAN. Further, the communication method according to the present invention effectively controls off-loading of traffic by an eNB even when a UE roams.

MODE FOR CARRYING OUT THE INVENTION

Hereinafter, exemplary embodiments of the present invention will be described with reference to the accompanying drawings.

Figure 1:
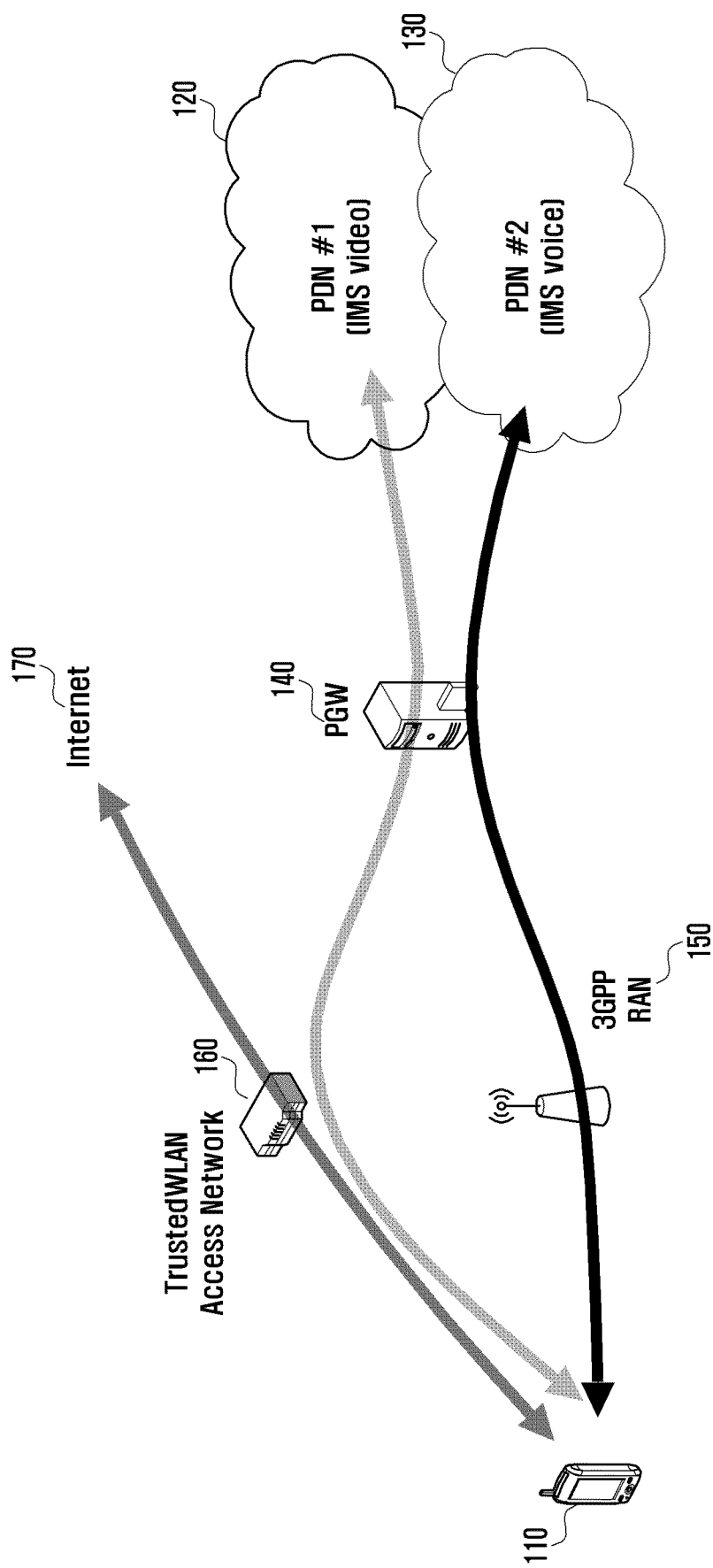
FIG. 1 is a view schematically illustrating a situation of transmitting and receiving data by simultaneously using a $3^{rd}$ Generation Partnership Project (3GPP) access network and a non-3GPP access network according to an embodiment of the present invention.

FIG. 1 is a view schematically illustrating a situation of transmitting and receiving data by simultaneously using a $3^{rd}$ Generation Partnership Project (3GPP) access network and a non-3GPP access network according to an embodiment of the present invention.

Referring to FIG. 1, a WLAN 160 may be used as a non-3GPP access network. As illustrated in FIG. 1, a UE 110, while transmitting data by generating one or more Packet Data Network (PDN) connections 120 and 130 by a 3GPP access network 150, can transmit data by generating other PDN connections 120 and 130 by a WLAN 160. Further, other pieces of data may be transmitted in the form of Non-Seamless WLAN offloading (NSWO) in which the WLAN 160 is directly connected to an Internet network 170 to be offloaded.

In particular, as illustrated in FIG. 1, for example, the UE 110 can generate PDN connections through a P-GW 140 when accessing a specific PDN (for example, two PDNs, i.e., the PDN 120 having IMS video as an APN and the another PDN 130 having IMS voice as an APN) through a Trusted WLAN Access Network (TWAN) 160.

At this time, when the specific PDN is overloaded, it is difficult or impossible to generate a new PDN in the corresponding PDN or modify a context (e.g., a Quality of Service (QoS) parameter, etc.) of the PDN. Here, the overload may include one or more of cases where a request, a task, and the number (or amount) of pieces of data, which are generated in or input from a network entity, are larger than a request, a task, and the number (amount) of pieces of data, which can be processed. Further, the overload corresponds to an overload generated in the PDN itself interworking with the P-GW 140 or an overload generated in the P-GW 140 in an end of the specific PDN. Further, in the description of an embodiment of the present invention, the specific PDN may be used as the same meaning as that of a specific APN. Further, the overload may be used as the same meaning as that of congestion.

Figure 2:
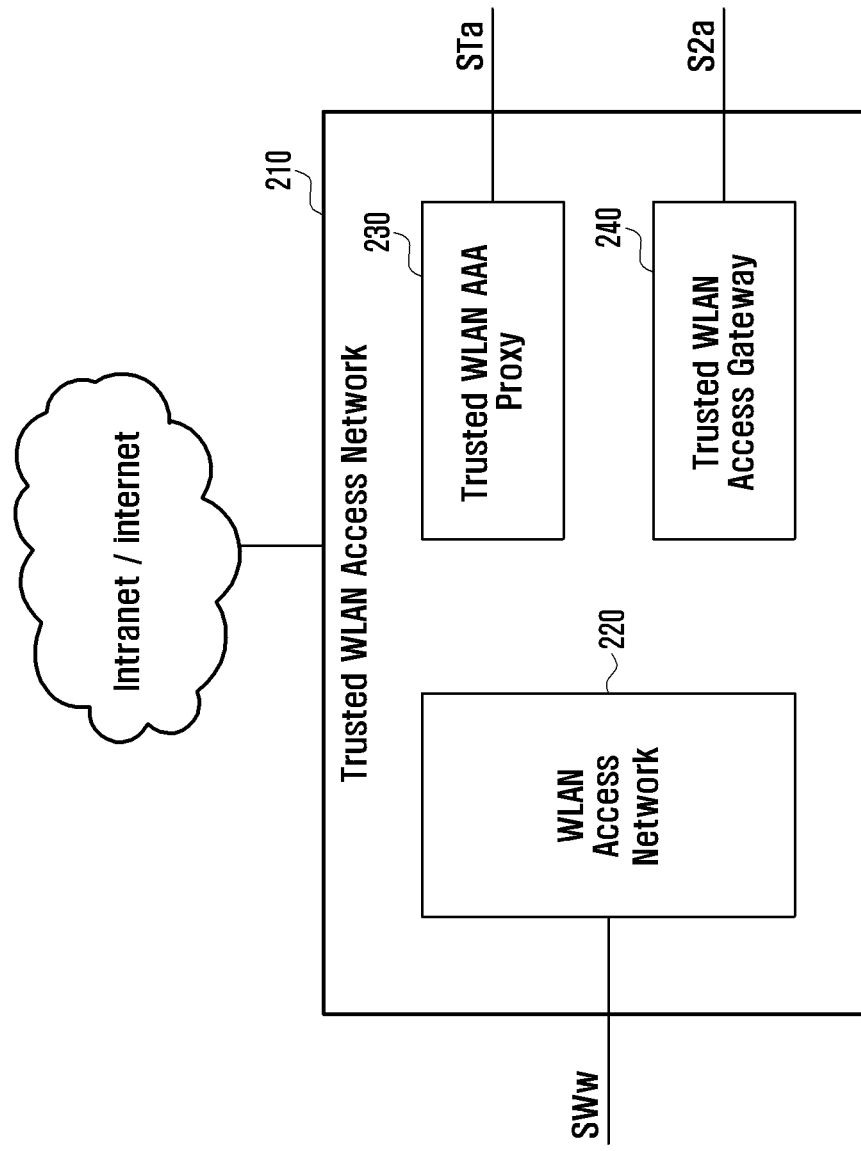
FIG. 2 is a block diagram illustrating an example of a Trusted WLAN Access Network (TWAN) according to an embodiment of the present invention.

FIG. 2 is a block diagram illustrating an example of a Trusted WLAN Access Network (TWAN) according to an embodiment of the present invention.

Referring to FIG. 2, a Trusted WLAN Access Network (TWAN) 210 includes a WLAN Access Network 220 configured by one or more WLANs, a Trusted WLAN Authentication, Authorization, and Accounting (AAA) Proxy 230 for interworking with AAA, and a Trusted WLAN Access Gateway (TWAG) 240 connecting the WLAN Access Network 210 and a P-GW (not illustrated).

An interface between the TWAG 240 and the P-GW is referred to as S2a, and a protocol such as a General Packet Radio Service (GPRS) Tunneling Protocol (GTP) or a Proxy Mobile Internet Protocol (PMIP) may be used herein. The above structure is only a logical structure, and, in practice, a physical configuration may be more freely configured. Further, according to an embodiment, the WLAN Access Network 220 and the TWAG 240 can be physically configured by the same entity in a communication system.

Hereinafter, the aforementioned problem, i.e., a method for making a support to generate one or more PDN connections for a specific PDN (or a specific APN) will be described through embodiments. However, it will be obvious to those skilled in the art to which the present invention pertains that the present invention is not limited to the embodiments and other modified embodiments based on the spirit of the present invention can be made in addition to the embodiments disclosed herein.

In the description of an embodiment of the present invention, although a network configuration including the TWAN will be mainly described for brevity of description, a main subject matter of the present invention may be employed for any situation of utilizing the PDN through the non-3GPP access network.

In the present specification, the TWAN and the WLAN may be mixedly used for convenience of description. Furthermore, although an entity communicating with a UE is limited to the TWAN for brevity of description, the entity with which the actual UE communicates through a protocol of messages which the actual UE exchanges may be at least one element within the TWAN (i.e., at least one of the WLAN access network, the TWAG, and the TWAP). For example, beacon messages may be transmitted by the WLAN access network within the TWAN. Furthermore, an Access Network Query Protocol (ANQP) method may be applied between the UE, the WLAN access network within the TWAN, an ANQP server connected thereto, and the TWAG. Further, a WLAN control layer message may be exchanged between the UE and the TWAG.

Figure 3:
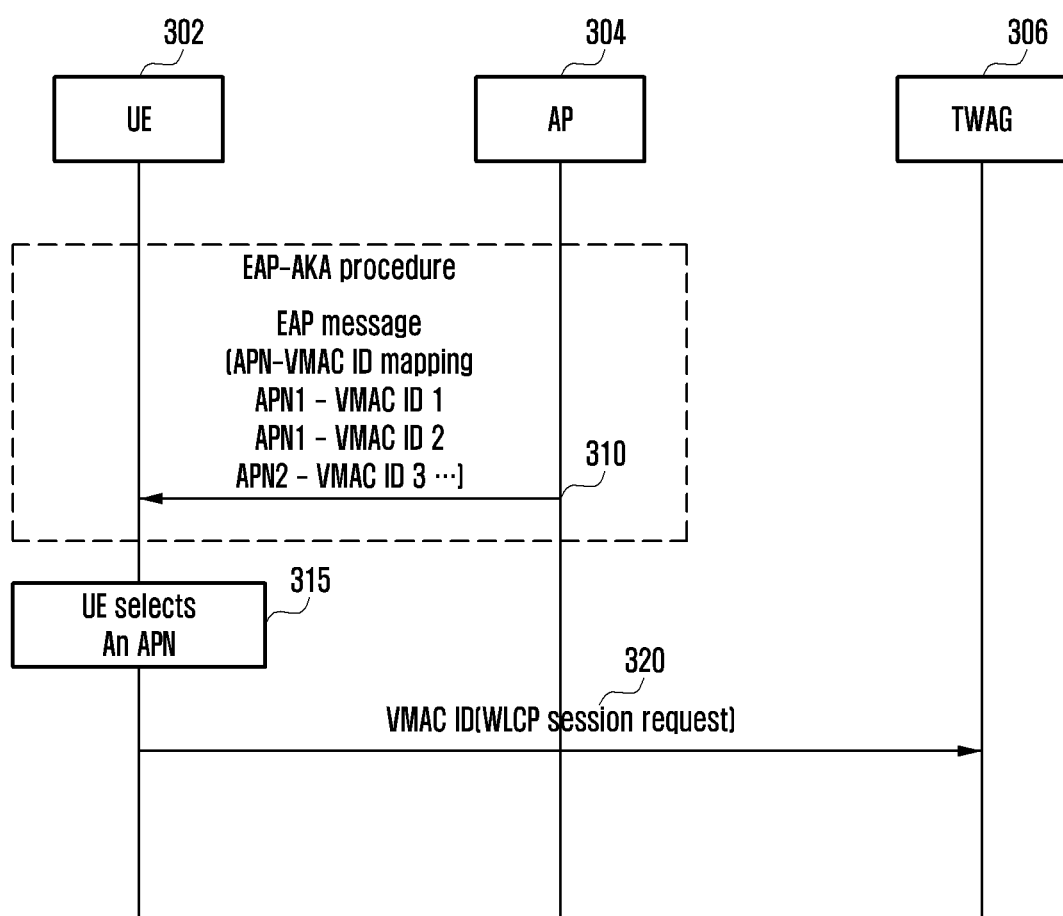
FIG. 3 is a signal flow diagram illustrating an operation between a UE and a TWAN according to an embodiment of the present invention.

FIG. 3 is a signal flow diagram illustrating an operation between a UE and a TWAN according to an embodiment of the present invention.

Referring to FIG. 3, in operation 310, an Access Point (AP) 304 within a TWAN transmits, to a UE 302, an Extensible Authentication Protocol (EAP) message including mapping of an APN and a virtual Media Access Control (MAC) address (hereinafter, referred to as a VMAC ID) of the TWAG 306.

In order to support generation of multiple PDN connections for one APN, the mapping information may be a form in which one APN includes one or more VMAC IDs of the TWAG 306. Further, the mapping information may include a VMAC ID for Non-Seamless WLAN offloading (NSWO). The EAP message may be a message transferred during an EAP-AKA process between the UE and the TWAN, for example, an EAP request/response message or an EAP success message.

The TWAN can transmit mapping information of the APN and the VMAC ID of the TWAG 306 only when the UE 302 is authenticated. In this process, mapping information only on NSWO or a specific APN may be selectively transmitted on the basis of subscription information of a user.

The UE 302 stores the information when receiving the information, and uses the information when accessing the corresponding TWAN. For example, when the UE 302 should generate a PDCN connection for a specific APN, the UE 302 selects an APN which the UE 302 is to access, in operation 315.

In operation 302, when transmitting a connection generation request message to the TWAG 306, the UE 302 configures a MAC address of a receiver as a VMAC ID matched with the corresponding APN on the basis of the information received in operation 301 and transmits the configured MAC address.

When the UE 302 should generate an additional PDN connection for an APN which has a PDN connection in advance, the UE 302 should configure a MAC address of a receiver using not a VMAC ID which has been used for the existing PDN connection but another VMAC ID and transmit the configured MAC address. When the PDN connection generation request is accepted, in a case of an upward direction, the UE 302 also configures a user data packet transmitted through the corresponding PDN connection as a VMAC ID corresponding to the MAC address of a receiver, and in a case of the TWAN (or the TWAG 306), the UE 302 also configures the user data packet as a VMAC ID corresponding to a MAC address of a transmitter. That is, the UE 302 and the TWAN (or the TWAG 306) generate a PDN connection using mapping information of the configured APN and the configured VMAC ID, and differentiate the PDN connection using the VMAC ID used when the PDN connection is generated.

Figure 4:
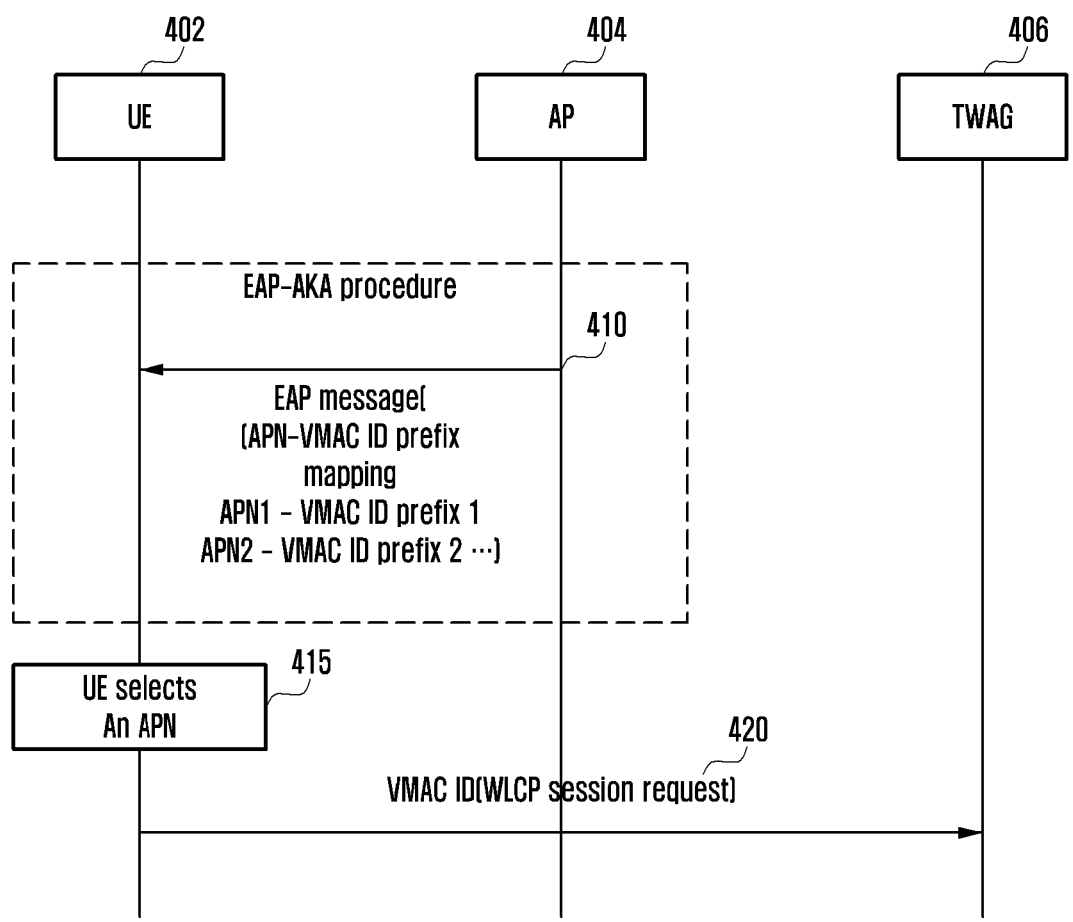
FIG. 4 is a signal flow diagram illustrating an operation between a UE and a TWAN in which a structure of a VMAC ID is changed according to an embodiment of the present invention.

FIG. 4 is a signal flow diagram illustrating an operation between a UE and a TWAN in which a structure of a VMAC ID is changed according to an embodiment of the present invention.

Referring to FIG. 4, in operation 401, an AP 404 within the TWAN transmits, to a UE 402, an EAP message including mapping information of an APN and a VMAC address of a TWAG 406.

In the present embodiment, one VMAC ID is segmented into a part corresponding to the APN and a part by which multiple PDN connections within one APN can be differentiated. In more detail, the VMAC ID is segmented into a prefix 425 and a connection ID 430, one prefix 425 corresponds to one APN, and the connection ID 430 after the prefix 425 serves to indicate an ID of various PDN connections for one APN. The lengths of the prefix 425 and the connection ID 430 within the VMAC ID can be different from each other according to a configuration. For example, when a virtual MAC address is 48 bits, the virtual MAC address is divided into a prefix 425 having 40 bits and a connection ID 430 having 8 bits, and mapping information for an IMS APN can be transmitted as follows.

*APN=IMS, VMAC ID* <prefix (40 bits)=0 . . . 0>

The UE 402 configures the VMAC ID as 0 . . . 0 (48 bits) when a first PDN connection for an IMS APN is generated, and configures the VMAC ID as 0 . . . 001 (48 bits) when a second PDN connection is generated. In this case, the connection ID 430 has 8 bits so that maximally 256 PDN connections for one APN can be generated.

Meanwhile, the mapping information may include a VMAC ID for NSWO. In a case of the NSWO, since maximally one connection can be generated, the concept of a prefix may not be applied to the VMAC ID for the NSWO. The EAP message may be a message transferred during an EAP-AKA process between the UE and the TWAN, for example, an EAP request/response message or an EAP success message.

The TWAN can transmit mapping information of the APN and the VMAC ID only when the UE is authenticated. In this process, mapping information only on NSWO or a specific APN may be selectively transmitted on the basis of subscription information of a user. The UE 402 stores the information when receiving the information, and uses the information when accessing the corresponding TWAN. In operation 415, the UE 402 can select an APN to access.

For example, when the UE should generate a PDN connection for a specific APN, if a connection generation request message is transferred to the TWAG 406, the UE 402 configures a MAC address of a receiver as a VMAC ID according to which number in order a PDN connection for the corresponding APN and a prefix matched with the corresponding APN corresponds to, and transmits the configured VMAC ID, in operation 420. When the PDN connection generation request is accepted, in a case of an upward direction, the UE also configures a user data packet transmitted through the corresponding PDN connection as a VMAC ID corresponding to the MAC address of a receiver, and in a case of the TWAN (or the TWAG), the UE also configures the user data packet as a VMAC ID corresponding to a MAC address of a transmitter. That is, the UE and the TWAN (or the TWAG) generate a PDN connection using mapping information of the configured APN and the configured VMAC ID, and differentiate the PDN connection using the VMAC ID used when the PDN connection is generated.

Figure 5:
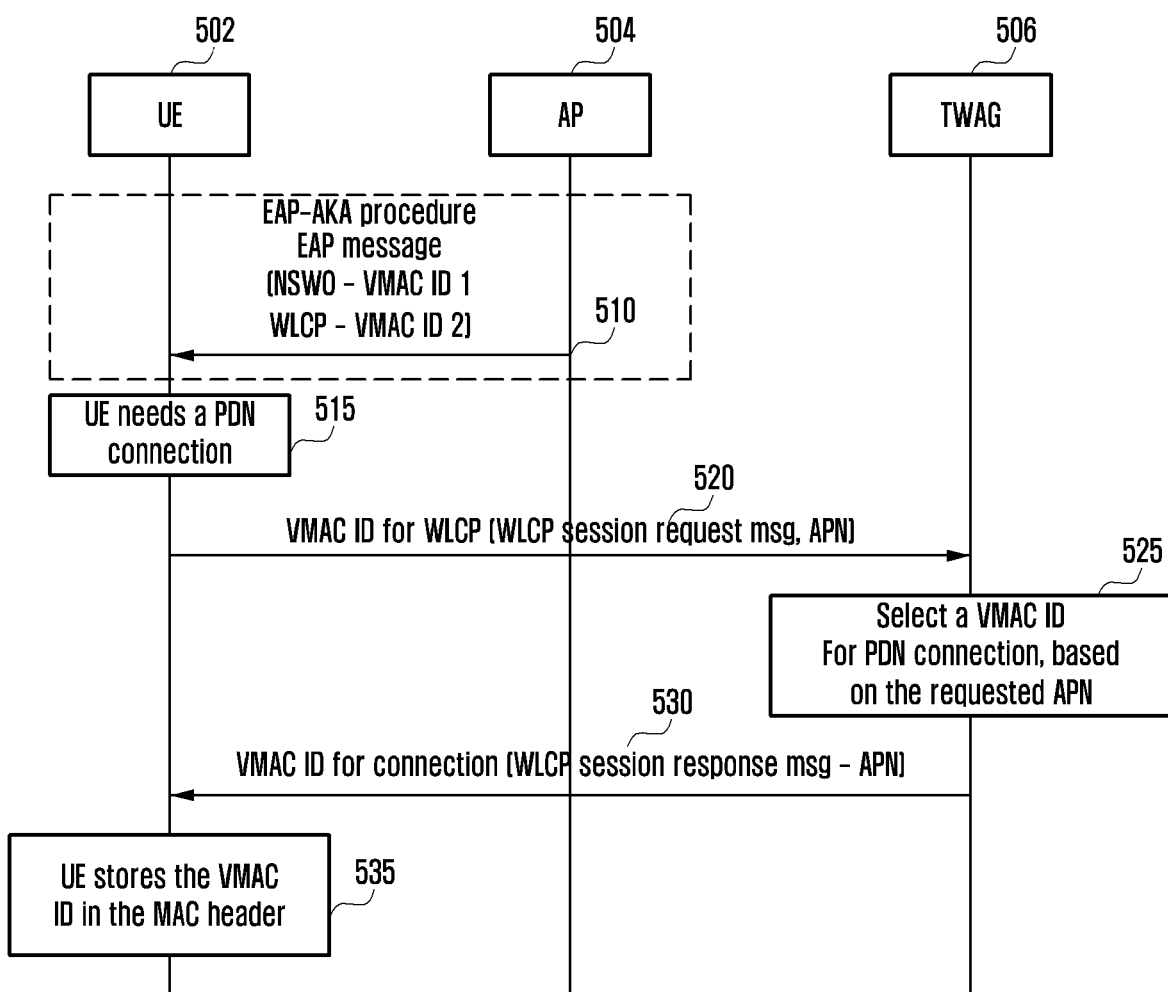
FIG. 5 is a signal flow diagram illustrating an operation between a UE and a TWAN in which a VMAC ID for NSWO and WLCP is basically provided according to an embodiment of the present invention.

FIG. 5 is a signal flow diagram illustrating an operation between a UE and a TWAN in which a VMAC ID for NSWO and WLCP is basically provided according to an embodiment of the present invention.

Referring to FIG. 5, in operation 510, an AP 504 within a TWAN includes mapping information of a VMAC ID for a WLCP (which is applied when a control is performed through the TWAG other than the NSWO), in an EAP message which is to be transmitted to a UE 502. The EAP message may be a message transferred during an EAP-AKA process between the UE 502 and the TWAN, for example, an EAP request/response message or an EAP success message. Further, the mapping information may include mapping information of a VMAC ID for NSWO. The TWAN can transmit mapping information of the APN and the VMAC ID only when the UE is authenticated. In this process, mapping information may be selectively transmitted in order to prevent the NSWO or the WLCP from being used, on the basis of subscription information of a user.

The UE 505 stores the information when receiving the information, and uses the information when accessing the corresponding TWAN.

For example, when the UE 502 should generate a PDN connection for an APN in operation 515 (that is, including a case of not the NSWO), in operation 502, the UE 502 configures and transmits a VMAC ID matched with a WLCP corresponding to a MAC address of a receiver when transmitting a connection generation request message to the TWAG 506.

Further, the WLCP message, which has been transmitted to the TWAG 506, should include information indicating a PDN connection generation request together with an APN to be used. When the PDN connection generation request is accepted, in operation 525, the TWAG 506 determines which number in order a PDN connection for a requested APN is generated and then selects a VMAC ID, and in operation 530, when an acceptance message for the connection generation request is transmitted, the transmission is performed in a state in which a MAC address of a transmitter is configured to be the selected VMAC ID. In an embodiment, the TWAG 506 can transmit a MAC header including the VMAC ID to the UE 502.

In operation 535, the UE 502 can store the VMAC ID on the basis of the received message, and can communicate with a specific APN using the received VMAC ID at a time of subsequent data transmission/reception.

For a case where one TWAG 506 receives a plurality of request messages from the same UE 502, a WLCP request message transmitted from the UE 502 includes a transaction ID, and a response message, which is transmitted after the TWAG 506 processes the WLCP request message, may include the same transaction ID. Thereafter, in a case of an upward direction, the UE 502 also configures a user data packet transmitted through the corresponding PDN connection as a VMAC ID corresponding to the MAC address of a receiver, and in a case of the TWAN (or the TWAG 506), the UE 502 also configures the user data packet as a VMAC ID corresponding to a MAC address of a transmitter.

Figure 6:
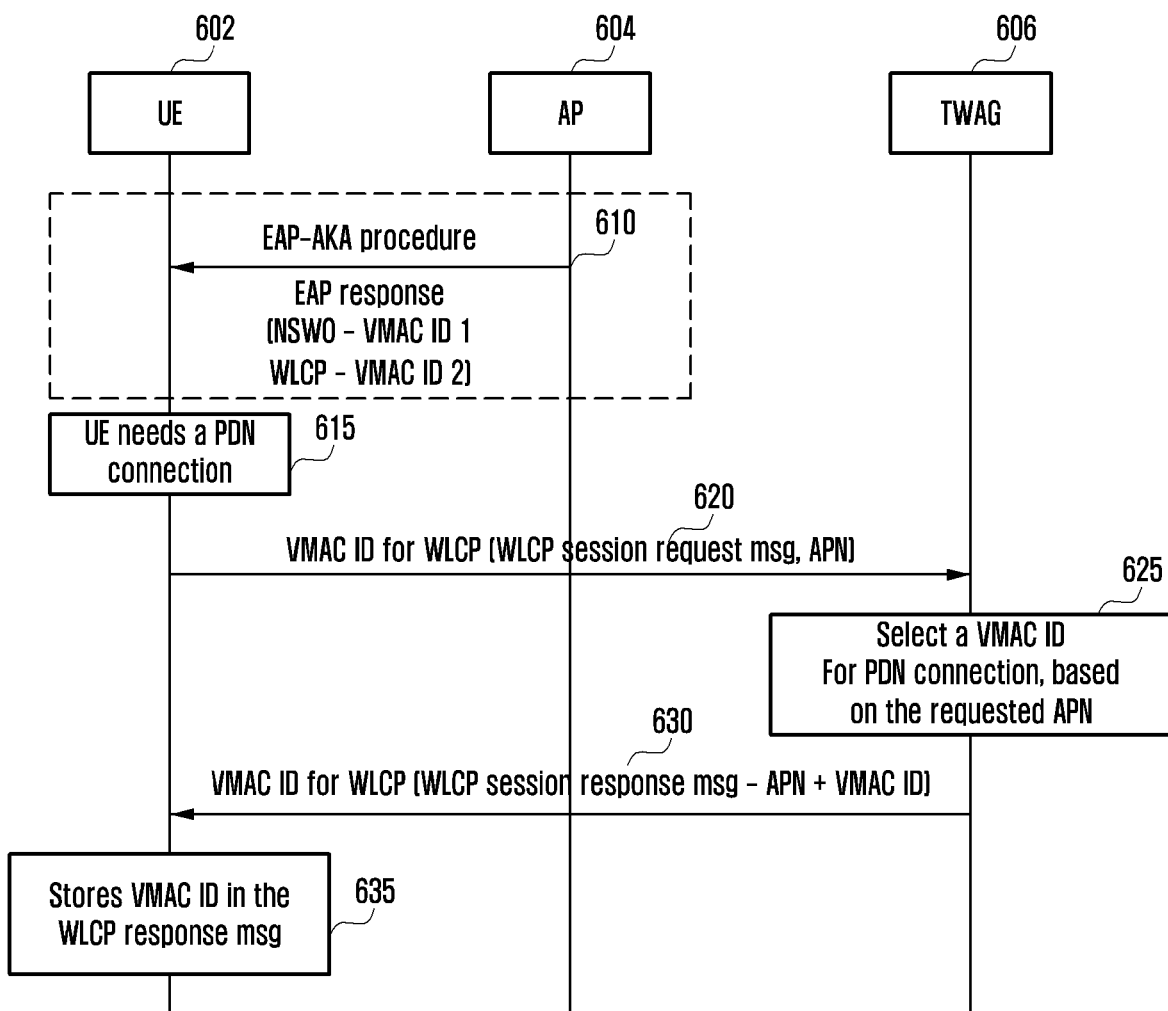
FIG. 6 is a signal flow diagram illustrating an operation between a UE and a TWAN according to another embodiment of the present invention.

FIG. 6 is a signal flow diagram illustrating an operation between a UE and a TWAN according to another embodiment of the present invention.

Referring to FIG. 6, in operation 610, an AP 604 within a TWAN includes mapping information of a VMAC ID for a WLCP (which is applied when a control is performed through the TWAG other than the NSWO), in an EAP message which is to be transmitted to a UE 602. The EAP message may be a message transferred during an EAP-AKA process between the UE 602 and the TWAN, for example, an EAP request/response message or an EAP success message. Further, the mapping information may include mapping information of a VMAC ID for NSWO. The TWAN can transmit mapping information of the APN and the VMAC ID when the UE 602 is authenticated. In this process, mapping information may be selectively transmitted in order to prevent the NSWO or the WLCP from being used, on the basis of subscription information of a user.

The UE 602 stores the information when receiving the information, and uses the information when accessing the corresponding TWAN.

When the UE 602 should generate a PDN connection for an APN in operation 615 (that is, in a case of not the NSWO), in operation 620, the UE 602 configures and transmits a VMAC ID matched with a WLCP corresponding to a MAC address of a receiver when transmitting a connection generation request message to the TWAG 606. Further, the WLCP message, which has been transmitted to the TWAG 606, should include information indicating a PDN connection generation request together with an APN to be used.

When the PDN connection generation request is accepted, in operation 625, the TWAG 606 determines which number in order a PDN connection for the requested APN is generated, and then selects a VMAC ID. In operation 630, when the TWAG 606 transmits an acceptance message for the PDN connection generation request, a MAC address of a transmitter is configured as a VMAC ID of a WLCP, but the acceptance message is transmitted to the UE 602 while including a VMAC ID to be used in the corresponding PDN connection in the future.

In operation 635, the UE 602 can store the VMAC ID on the basis of the received message, and can communicate with a specific APN using the received VMAC ID at a time of subsequent data transmission/reception.

For a case where one TWAG 606 receives a plurality of request messages from the same UE 602, a WLCP request message transmitted from the UE 602 includes a transaction ID, and a response message, which is transmitted after the TWAG 606 processes the WLCP request message, may also include the same transaction ID. Thereafter, in a case of an upward direction, the UE 602 also configures a user data packet transmitted through the corresponding PDN connection as a VMAC ID corresponding to the MAC address of a receiver, and in a case of the TWAN (or the TWAG 606), the UE 602 also configures the user data packet as a VMAC ID corresponding to a MAC address of a transmitter.

Figure 7:
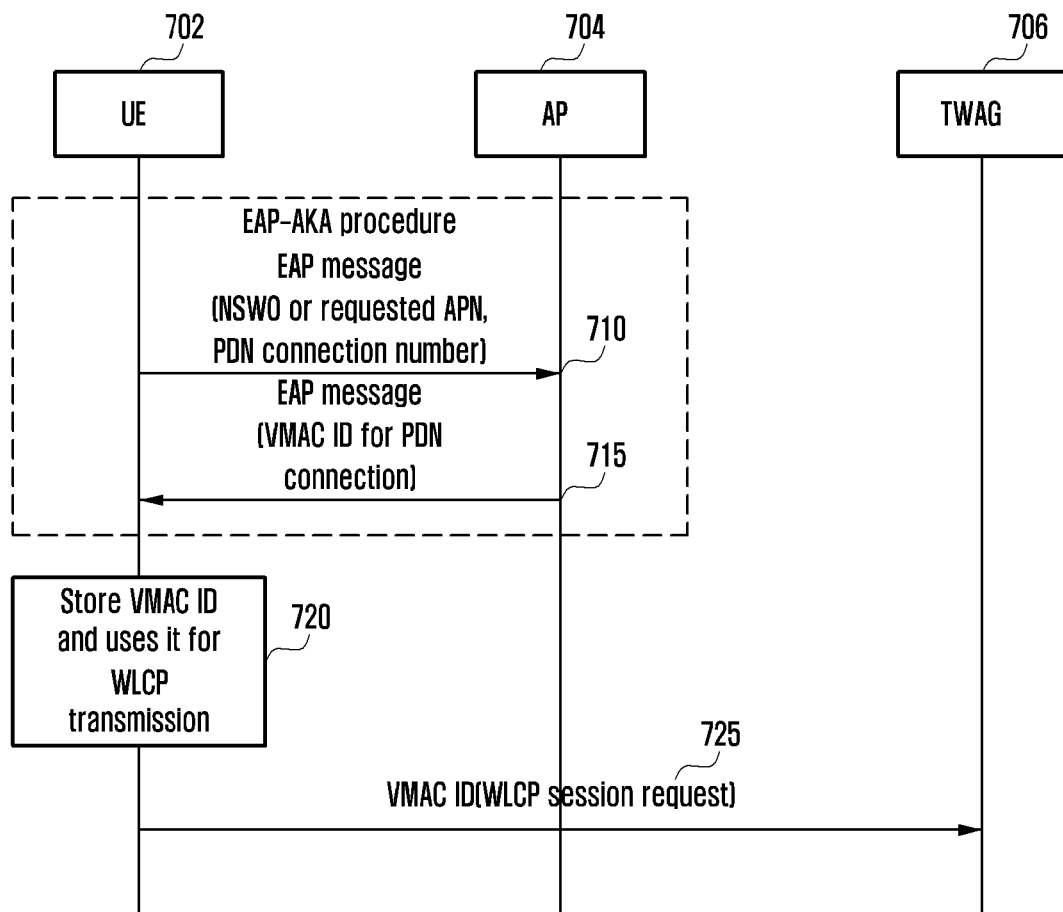
FIG. 7 is a signal flow diagram illustrating an operation between a UE and a TWAN in which a VMAC ID is configured through an inquiry process according to an embodiment of the present invention.

FIG. 7 is a signal flow diagram illustrating an operation between a UE and a TWAN in which a VMAC ID is configured through an inquiry process according to an embodiment of the present invention.

As illustrated in FIG. 7, in operation 710, in a case where a UE 702 itself requests NSWO, in a case where a PDN connection generation request for a specific APN is made, or in a case where an additional PDN connection generation request is made in a state in which a PDN connection for one APN already exists, the UE 702 transmits an EAP message to a TWAN 704 while the EAP message includes information on the cases. The EAP message may be a message transferred during an EAP-AKA process between the UE 702 and the TWAN 704, for example, an EAP request/response message or an EAP success message.

When authentication between the UE 702 and the TWAN 704 has already been terminated, if generation or modification of a connection is required, the UE 702 makes a request by transmitting the EAP message to the TWAN 704 at any time other than the EAP-AKA process.

In operation 715, the TWAN 704 can transmit a virtual MAC address (hereinafter, referred to as a VMAC ID) to be used in the future according to a request from the UE 702 while the VMAC ID is included in the EAP message.

At this time, the TWAN 704 can transmit information on the VMAC ID when the UE 702 is authenticated. In this process, mapping information may be selectively transmitted in order to prevent NSWO or a specific APN from being used, on the basis of subscription information of a user.

In operation 720, when the UE 702 receives the information, the UE 702 stores the information, and in operation 725, when transmitting a connection generation request message to the TWAG 706, the UE 702 configures a MAC address of a receiver as the corresponding VMAC ID and transmits the configured MAC address. Thereafter, in a case of an upward direction, the UE 702 also configures a user data packet transmitted through the corresponding PDN connection as a VMAC ID corresponding to the MAC address of a receiver, and in a case of the TWAN (or the TWAG 706), the UE 702 also configures the user data packet as a VMAC ID corresponding to a MAC address of a transmitter.

Figure 8:
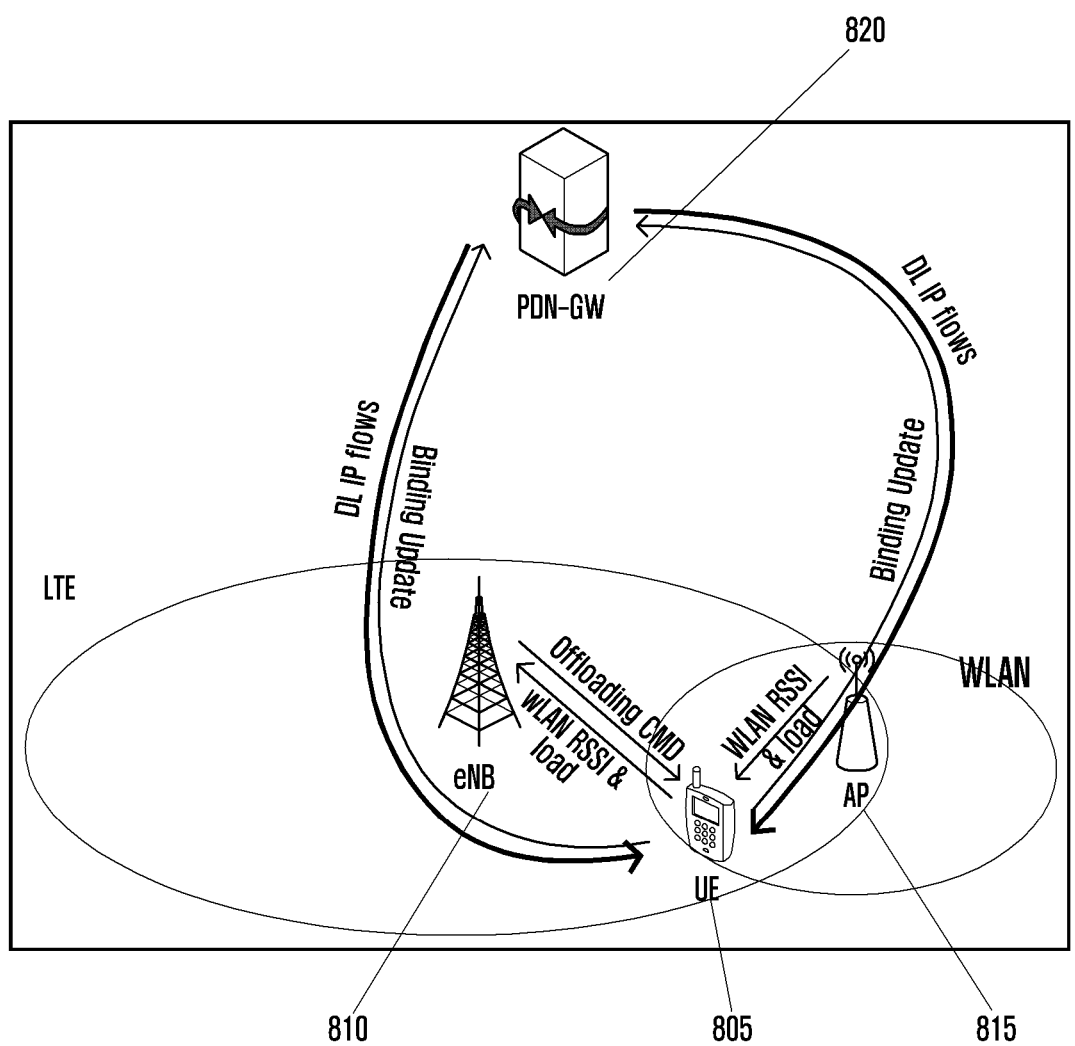
FIG. 8 is a view illustrating a structure of a communication system according to another embodiment of the present invention.

FIG. 8 is a view illustrating a structure of a communication system according to another embodiment of the present invention.

Referring to FIG. 8, whether a UE 805 transmits/receives data through a WLAN 815 generally accords with a rule (or a policy) predetermined in a general UE or accords with a rule received from an ANDSF server. However, when traffic offloading is performed by the WLAN, in order to consider a situation of a 3GPP access network (2G/3G or LTE) or more dynamically control the traffic offloading, a method of making a command by an eNB 810 can be used as follows.

That is, the eNB 810 can command the UE 805 to notify a situation of a neighboring WLAN, collect information on the situation, and indicate the UE 805 to perform offloading of specific traffic to the WLAN 815 in consideration of the information and a state of the eNB 810 itself.

To this end, the eNB can transmit, using an RRC message, a policy used when traffic is offloaded to a WLAN to be applied by a specific UE. This message may include an ID list (SSID, service provider ID, etc.) of a WLAN which can be selected by a UE and a priority value for each WLAN. Further, the message may include a state condition of a 3GPP eNB/cell for using a WLAN, e.g., a channel state between the UE and the eNB (which can be expressed by an intensity of a reception signal, e.g., an RSSI, etc.) or a congestion state of a 3GPP eNB/cell (which can be expressed by a barring factor, an offloading preferred level, or the like). Further, the message may include a state condition of the WLAN, e.g., a channel utilization factor of the WLAN or a load state of a backhaul to which the WLAN is connected. This state condition may be used as a threshold value for determining application of offloading by the UE. Further, this message may include an identifier of traffic to be offloaded to the WLAN, e.g., an APN or an EPS bearer ID. The UE, which has received the same, determines whether traffic is offloaded to the WLAN, on the basis of a policy transmitted from the eNB. The UE can apply offloading only when an offloading condition (a threshold value for a state condition of a 3GPP eNB/cell) is compared with a state received from an actual eNB/cell or a WLAN AP and the comparison is satisfied. Further, when the application is performed, a WLAN can be selected on the basis of a list of WLANs, and traffic to be offloaded can be selected from among the configured traffic objects.

As another method, the eNB can transmit, using an RRC message, a command used when traffic is offloaded to a WLAN to be applied by a specific UE. This message may include an ID (SSID, service provider ID, etc., which can identify a WLAN) of a WLAN to be selected by a UE, and this message may include an identifier of traffic to be offloaded to the WLAN, e.g., an APN or an EPS bearer ID. To this end, when receiving a bearer context from an MME, the eNB can additionally receive information on which PDN connection each EPS bearer belongs to or information on a PDN connection for which APN each EPS bearer belongs to. Further, the eNB can additionally receive, from the MME, information on whether it is allowed that traffic is offloaded to a WLAN for each APN, each PDN connection or each EPS bearer. The additional reception may be performed by adding APN information to which a bearer belongs and information on whether each bearer is offloaded to an E-RAB to be setup item IE of an S1 message (e.g., an initial UE context setup request, an E-RAB setup request, etc.) which is transmitted from the MME to the eNB. The UE, which has received the offloading command from the eNB, determines whether traffic is offloaded to the WLAN. That is, the UE selects a target WLAN on the basis of the received command, and offloads target traffic included in the received command when the WLAN is accessible. When the commanded WLAN is unusable, the WLAN can be notified to the eNB.

As yet another method, the eNB does not provide a parameter for offloading through the WLAN to each UE, but transfers the parameter using broadcasting information. A receiver of the broadcasting message is not limited to one UE, and a UE in an idle mode can receive and use the broadcasting message. This message may include an ID list (SSID, service provider ID, etc.) of a WLAN which can be selected by a UE and a priority value for each WLAN. Further, the message may include a state condition of a 3GPP eNB/cell for using a WLAN, e.g., a channel state between the UE and the eNB (which can be expressed by an intensity of a reception signal, e.g., an RSSI, etc.) or a congestion state of a 3GPP eNB/cell (which can be expressed by a barring factor, an offloading preferred level, or the like). Further, the message may include a state condition of the WLAN, e.g., a channel utilization factor of the WLAN or a load state of a backhaul to which the WLAN is connected. This state condition may be used as a threshold value for determining application of offloading by the UE. Further, this message may include an identifier of traffic to be offloaded to the WLAN, e.g., an APN or an EPS bearer ID. The UE, which has received the same, determines whether traffic is offloaded to the WLAN, on the basis of a policy transmitted from the eNB. The UE can apply offloading only when an offloading condition (a threshold value for a state condition of a 3GPP eNB/cell) is compared with a state received from an actual eNB/cell or a WLAN AP and the comparison is satisfied. Further, when the application is performed, a WLAN can be selected on the basis of a list of WLANs, and traffic to be offloaded can be selected from among the configured traffic objects.

The UE uses one or more policies when making a determination relating to WLAN offloading, and the policies may collide with each other. The UE can consider the following pieces of information when executing the WLAN offloading.

User preference setting: Information configured by user (highest priority)
Local operating environment: Information in which UE is configured
ANDSF policy: Information received from ANDSF
RAN control information: Information received from eNB (lowest priority)

When some pieces of the information are configured in the UE, the priority is in an order of 1) User preference setting, 2) Local operating environment, 3) ANDSF policy, and 4) RAN control information.

When an eNB-based offloading control method is used, if the UE 805 is in a roaming situation (that is, if an HPLMN part of an IMSI of the UE is different from a PLMN ID of a provider which provides a service to a current eNB), the eNB 810 is always under a control of a VPLMN (Visited provider). At this time, since the eNB 810 cannot know whether a HPLMN (Home provider) of a user allows traffic offloading using the WLAN 815 or not, the user may feel dissatisfaction or there may be problems in charging for a service.

Figure 9:
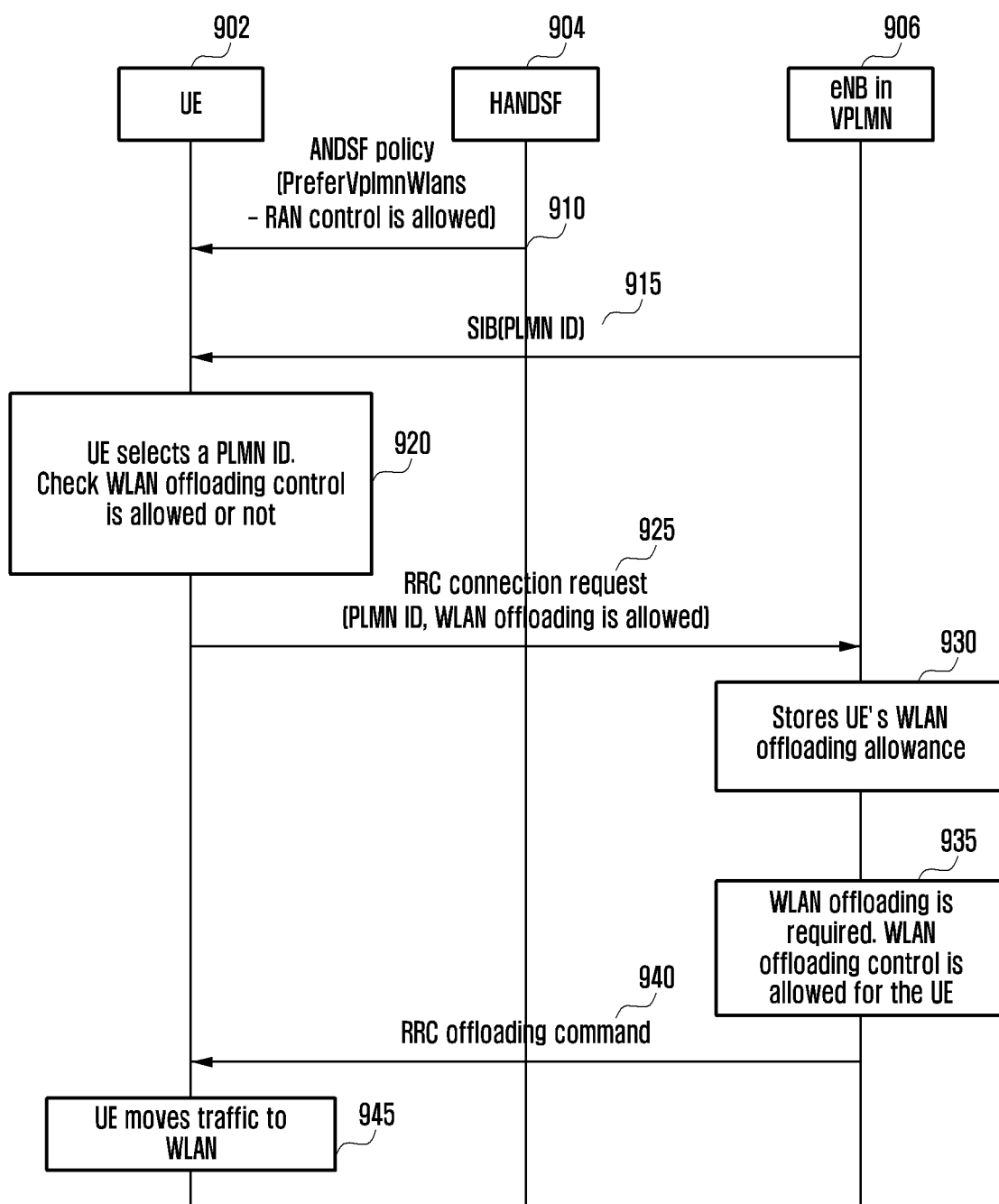
FIG. 9 is a signal flow diagram illustrating an operation between a UE and a network for solving the above problem.

FIG. 9 is a signal flow diagram illustrating an operation between a UE and a network for solving the above problem.

According to FIG. 9, in operation 910, a UE 902 receives an ANDSF policy from an ANDSF server 904 of a HPLMN and stores the received ANDSF. According to an embodiment, when the UE 902 roams to the VPLMN, the ANDSF policy includes whether a traffic offloading control to a WLAN of an eNB of a VPLMN is allowed or not. According to another embodiment, the information may be not received from the ANDSF server 904, but may be preset in the UE 902. Meanwhile, when the control is performed regardless of a Public Land Mobile Network (PLMN) or roaming, information provided by an ANDSF server or information configured in a UE may simply include whether use of traffic offloading control information to a WLAN provided by an eNB is allowed or not.

In operation 915, the UE 902 can access a roaming eNB 906. The UE 902 can receive an SIB message from the roaming eNB 906 with the access. The SIB message may include a PLMN ID of the roaming eNB 906. Further, according to the aforementioned embodiment, the SIB message may include control information and a policy relating to WLAN offloading of a UE.

In operation 920, the UE 902 can determine whether the WLAN offloading is allowed in a network of the roaming eNB 906 or not on the basis of one or more of the messages received in operations 910 and 915 and the PLMN ID selected by itself. When the WLAN offloading control information for a UE is received while being included in the SIB message, the UE can determine whether the received control information is used or not on the basis of the information received in operation 910.

In operation 925, when the UE 902 accesses the roaming eNB 906, the UE can notify whether a PLMN, which provides a current service, can be subjected to a traffic offloading control of the eNB 906. This can be performed using a part of fields of an RRC message (e.g., an RRC connection setup request or an RRC connection setup complete message).

In operation 930, the roaming eNB 906 can store one or more pieces of information received in operation 925. Further, the roaming eNB 906 can transfer the traffic offloading control allowance received by itself to a core network node using an S1/Iu message, and store the traffic offloading control allowance.

In operation 935, the roaming eNB 906 determines whether a traffic offloading control is performed or not based on at least one information. The roaming eNB 906 can determine whether the traffic offloading control information is downloaded or not on the basis of one or more of a congestion of an eNB, a policy of a roaming provider, and types of traffic.

In operation 940, the roaming eNB 906 can transmit a traffic offloading control message to the UE 902.

In operation 945, the UE 902 can move traffic by the WLAN on the basis of the message or the SIB message which is received in operation 940.

Figure 10:
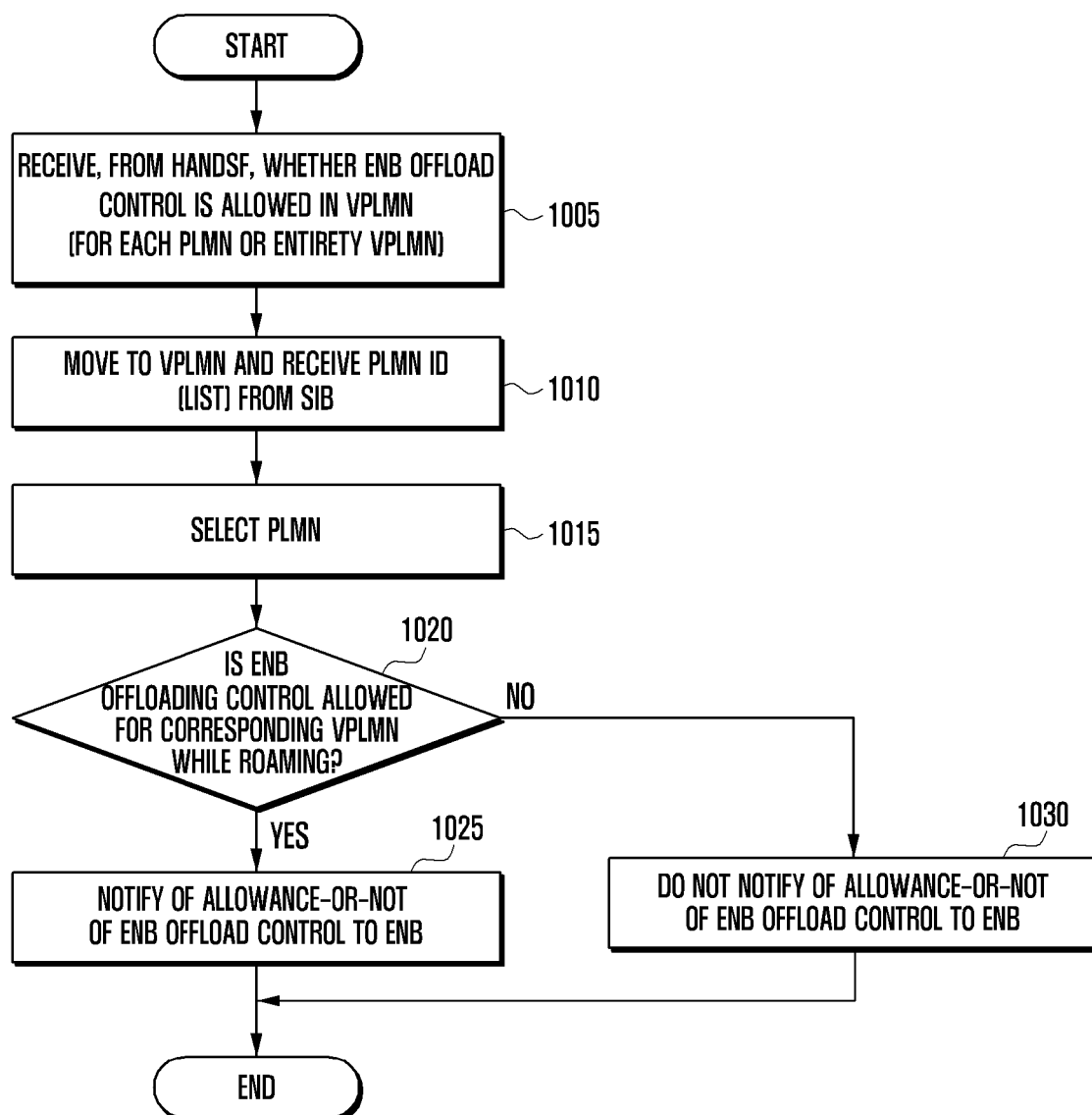
FIG. 10 is a flowchart illustrating an operation of a UE in detail according to an embodiment of the present invention.

FIG. 10 is a flowchart illustrating an operation of a UE in detail according to an embodiment of the present invention. In more detail, FIG. 10 illustrates an operation of a UE according to the embodiment of FIG. 9.

Referring to FIG. 10, in operation 1005, a UE can receive a policy indicating whether a VPLMN can be subjected to an offloading control of an eNB or not from an ANDSF server in a Home network. The information may be expressed by adding an indicator indicating whether an offloading control is allowed for each PLMN included in a PreferVplmnWlans list of an ANDSF policy or not. That is, the policy may be configured for each PLMN or may be configured such that an offloading control of an eNB is not performed when a user is roaming. Otherwise, the policy may include only information indicating whether a UE is simply allowed to use WLAN traffic offloading control information provided by an eNB regardless of a PLMN or a roaming state. Further, although the policy can be received from an ANDSF server, the policy can operate while being configured in the UE in advance.

In operation 1010, when in a roaming state, the UE can identify which PLMN is provided by receiving an SIB from the eNB.

In operation 1015, the UE can select a PLMN according to a PLMN selection policy.

In operation 1020, the UE can determine whether a traffic offloading control of the eNB is allowed for the selected PLMN or not, on the basis of the configured policy.

When the control is allowed, in operation 1025, the UE notifies the eNB that a traffic offloading control of an eNB is allowed in a currently-selected PLMN using a separate RRC message in a process of generating an RRC connection with the eNB or in a state in which the RRC connection is made.

When the traffic offloading control is not allowed, in operation 1030, the UE provides no information to the eNB. According to another embodiment, the UE can explicitly notify the eNB that the UE does not support the traffic offloading control.

According to an embodiment, when the UE notifies that the traffic offloading control is allowed, the eNB can transmit a traffic offloading control message to the UE.

The embodiment of FIG. 10 is modified as follows when WLAN traffic offloading control information is transmitted while being included in an SIB. The UE receives an SIB in operation 1010 and selects a PLMN in operation 1015. At this time, when the offloading control information is received through the SIB, the UE determines whether an eNB offloading control is allowed through a policy received in operation 1005 (or a policy preset in the UE). When the eNB offloading control is allowed, the UE can perform traffic offloading using the offloading control information included in the SIB.

Figure 11:
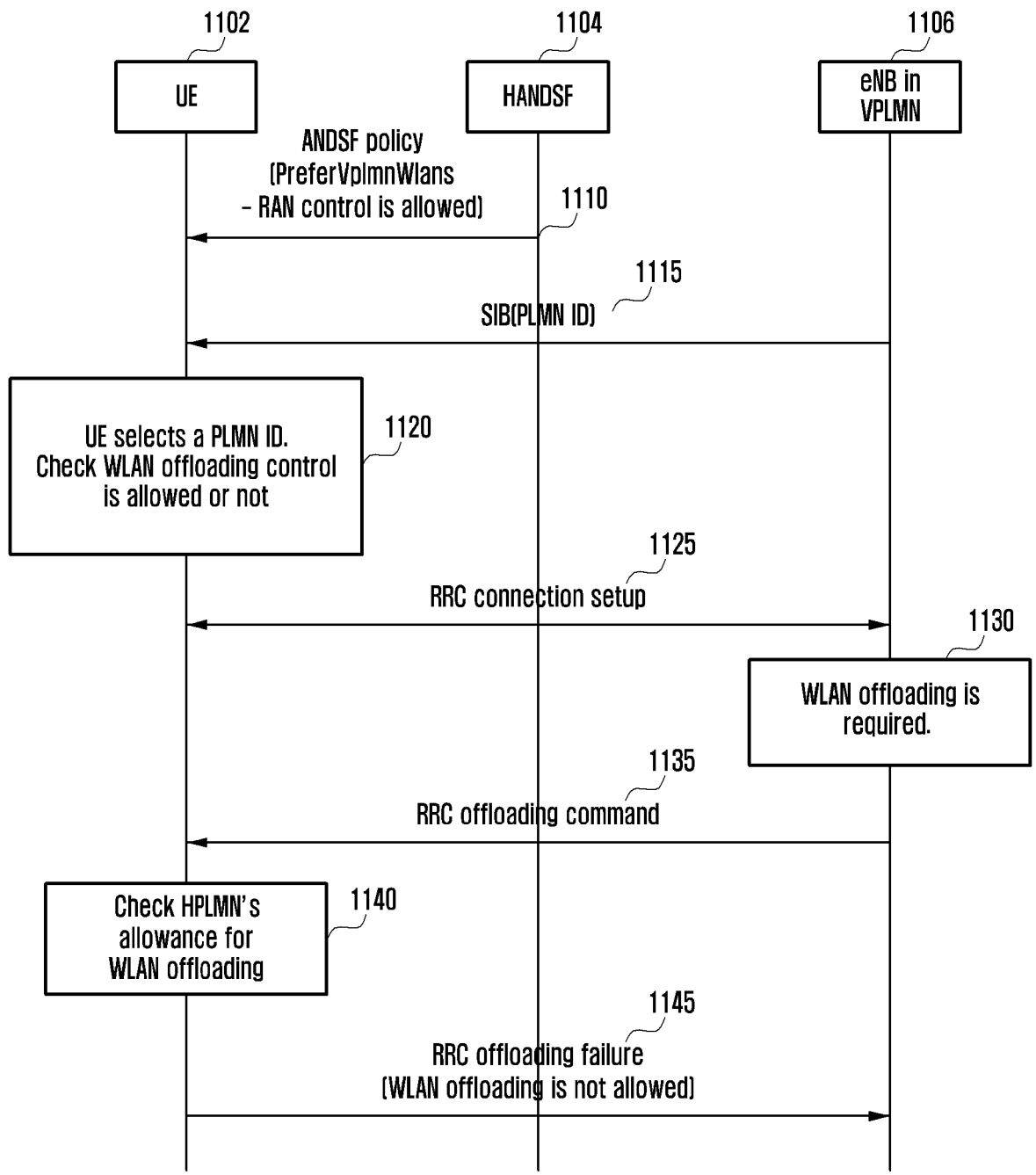
FIG. 11 is a signal flow diagram illustrating an operation between a UE and a network when off-loading allowance information is not notified of in advance according to an embodiment of the present invention.

FIG. 11 is a signal flow diagram illustrating an operation between a UE and a network when off-loading allowance information is not notified of in advance according to an embodiment of the present invention. Referring to FIG. 11, in operation 1110, a UE 1102 receives and stores an ANDSF policy from an ANDSF server 1104 of a HPLMN while the ANDSF policy includes information on whether a traffic offloading command to WLAN of an eNB is allowed or not when the UE 1102 roams to a VPLMN.

In a case of another embodiment, the information is not received from the ANDSF server 1104 but is predetermined in the UE 1102.

In operation 1115, the UE 1102 can access a roaming eNB 1106. The UE 1102 can receive an SIB message from the roaming eNB 1106 together with the access. The SIB message may include a PLMN ID of the roaming eNB 1106.

In operation 1120, the UE 1102 can determine whether a WLAN offloading control is allowed in a network of the roaming eNB 1106, on the basis of the messages received in operations 1110 and 1115.

In operation 1125, the UE 1102 can be connected to the WLAN 1106.

In operation 1130, the roaming eNB 1106 can determine whether traffic offloading is needed or not. The roaming eNB 1106 can determine whether the traffic offloading control information is downloaded or not, on the basis of one or more of congestion of the eNB, a policy of a roaming provider, and a type of traffic.

In operation 1135, the roaming eNB 1106 can transmit a traffic offloading control message to the UE 1102 on the basis of the determination result.

When the UE 1102 receives the traffic control message in operation 1135, the UE 1102 can determine whether a PLMN, which currently provides a service, can be subjected to a traffic offloading control, on the basis of the information received in operation 1110, in operation 1140.

When the traffic offloading control is allowed, the UE 1102 can perform traffic offloading according to a command. Otherwise, in operation 1145, the UE 1102 notifies the eNB 1106 that the traffic offloading is not allowed.

In an embodiment, the roaming eNB 1106 can transmit and store allowance-or-not of the traffic offloading control identified by itself to a core network node using an S1/Iu message.

Figure 12:
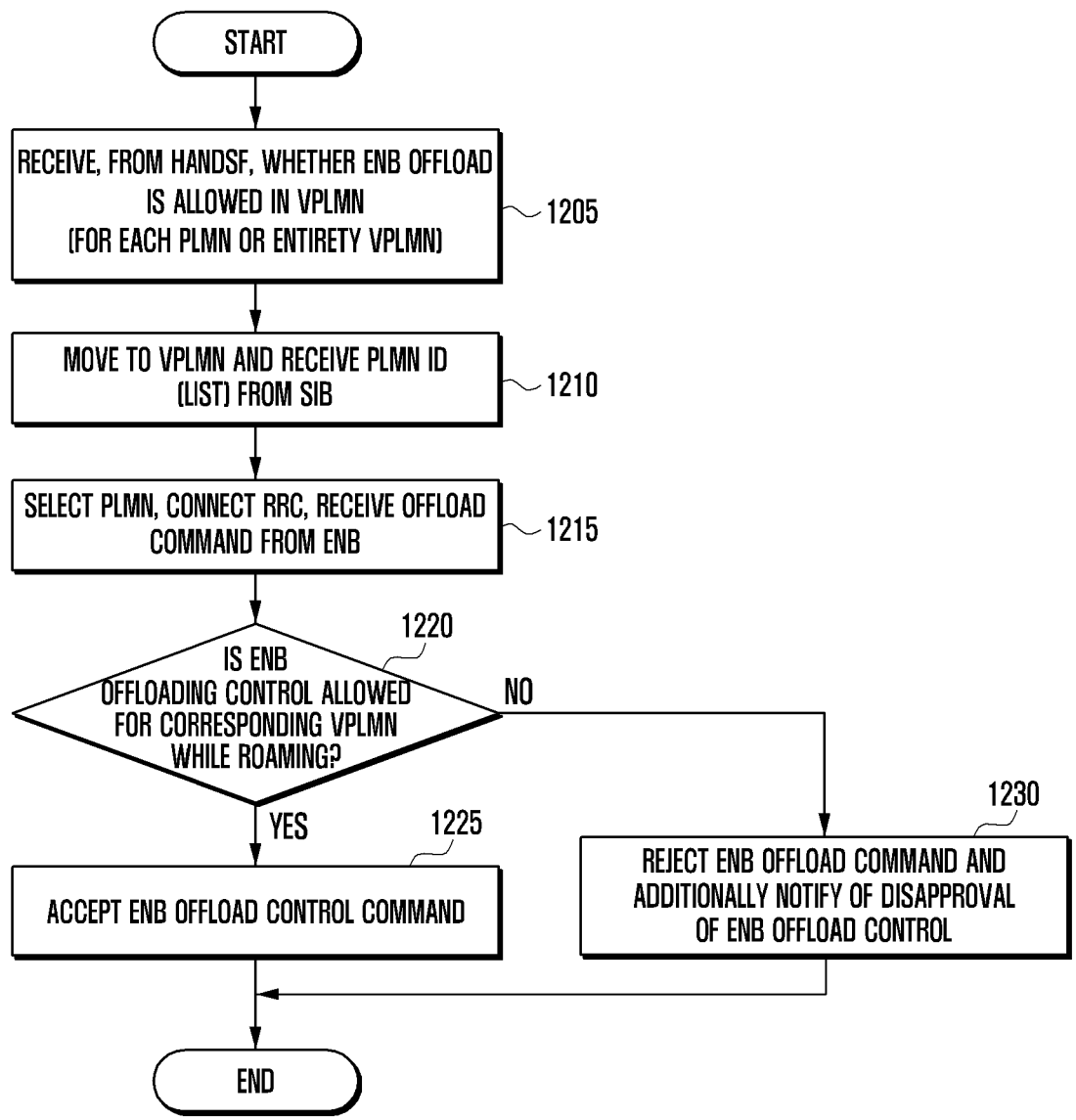
FIG. 12 is a flowchart illustrating an operation of a UE in detail according to an embodiment of the present invention.

FIG. 12 is a flowchart illustrating an operation of a UE in detail according to an embodiment. In more detail, FIG. 12 is a flowchart illustrating an operation of a UE according to the embodiment of FIG. 11.

Referring to FIG. 12, in operation 1205, a UE receives a policy indicating whether a VPLMN can be subjected to an offloading control of an eNB by an ANDSF server of a Home network. The information can be expressed by adding an indicator indicating whether an offloading control is allowed for each PLMN included in a PreferVplmnWlans of an ANDSF policy. That is, the policy can be configured for each PLMN or can be configured such that all VPLMNs are not subjected to an offloading control when a user is roaming. Otherwise, the policy may include only information indicating whether the UE allows use of WLAN traffic offloading control information provided by the eNB regardless of the PLMN or a roaming state. Further, the policy may be received from the ANDSF server, or may be preset in the UE.

In operation 1210, when in the roaming state, the UE can identify which PLMN is provided by receiving an SIB from the eNB.

In operation 1215, the UE can select a PLMN, can be connected to a roaming eNB, and can receive a traffic offloading command from the roaming eNB.

In operation 1220, the UE can determine whether an eNB traffic offloading control is allowed or not, on the basis of the configured policy for the selected PLMN.

In a case where the traffic offloading control is not allowed, in operation 1230, when the eNB transmits a traffic offloading control command, the UE transmits a rejection message to explicitly notify that the traffic offloading control of the eNB is not supported.

In contrast, when the traffic offloading control is allowed, in operation 1225, traffic offloading is performed according to a command.

The roaming eNB can identify information on whether the traffic offloading control is allowed or not according to whether the UE performs/rejects a command, store the information, and use the information for the traffic offloading control to be generated later.

Figure 13:
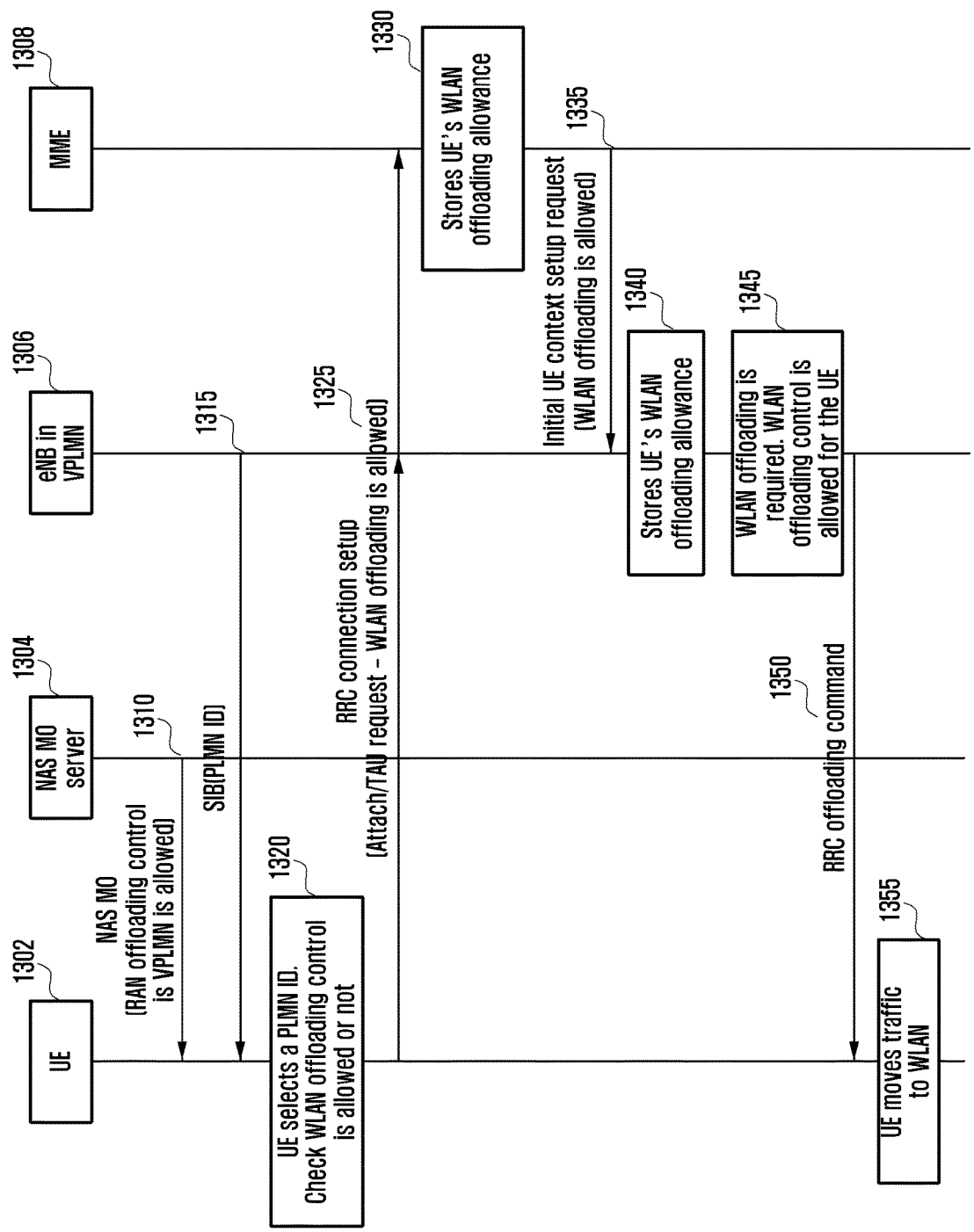
FIG. 13 is a signal flow diagram illustrating an operation between a UE and a network when NAS MO is used.

FIG. 13 is a signal flow diagram illustrating an operation between a UE and a network when a NAS MO is used.

Referring to FIG. 13, in operation 1310, a UE 1302 receives and stores a Non-Access Stratum (NAS) MO, and the NAS MO includes information on whether a traffic offloading command to WLAN of an eNB is allowed or not when the UE 1302 roams to the VPLMN. Otherwise, the NAS MO may include only information indicating whether the UE allows use of WLAN traffic offloading control information provided by the eNB regardless of a PLMN or a roaming state. Otherwise, the information is not received from an OMA-DM server 1304 but may be predetermined in the UE 1302.

In operation 1315, the UE 1302 can access a roaming eNB 1106. The UE 1302 can receive an SIB message from a roaming eNB 1306 with the access. The SIB message may include a PLMN ID of the roaming eNB 1306. Further, in the aforementioned embodiment, the SIB message may include control information or a policy relating to WLAN offloading of the UE.

In operation 1320, the UE 1302 can determine whether WLAN offloading is allowed or not in a network of the roaming eNB 1306 on the basis of at least one of the information configured in operation 1310 and the PLMN ID selected in operation 1310. When WLAN offloading control information for the UE is received while being included in the SIB, the UE can determine whether the received control information is used or not, on the basis of the information received in operation 1310.

In operation 1325, when the UE 1302 sends a registration request (Attach/TAU request) to a core network node (MME) 1308, the UE 1302 can notify whether a traffic offloading command of the eNB can be received from the PLMN which currently provides a service.

In operation 1330, the core network node 1308 can store the same.

In operation 1335, the core network node 1308 notifies of an identifier indicating whether a traffic offloading control is allowed or not to the roaming eNB 1306 when the UE 1302 is connected or a context of the UE is installed in the eNB. The eNB, which has received the same, can identify whether the traffic offloading control can be performed for the UE.

In operation 1340, the roaming eNB 1306 can store the information received in operation 1335.

In operation 1345, the roaming eNB 1306 can determine whether traffic offloading is needed or not. The roaming eNB 1306 can determine whether the traffic offloading command is ordered or not, on the basis of one or more of congestion of the eNB, a policy of a roaming provider, and a type of traffic.

In operation 1350, the roaming eNB 1304 can transmit a traffic offloading command to the UE 1302 on the basis of the determination result.

In operation 1355, the UE 1302 can perform the traffic offloading on the basis of the information received in operation 1350.

Figure 14:
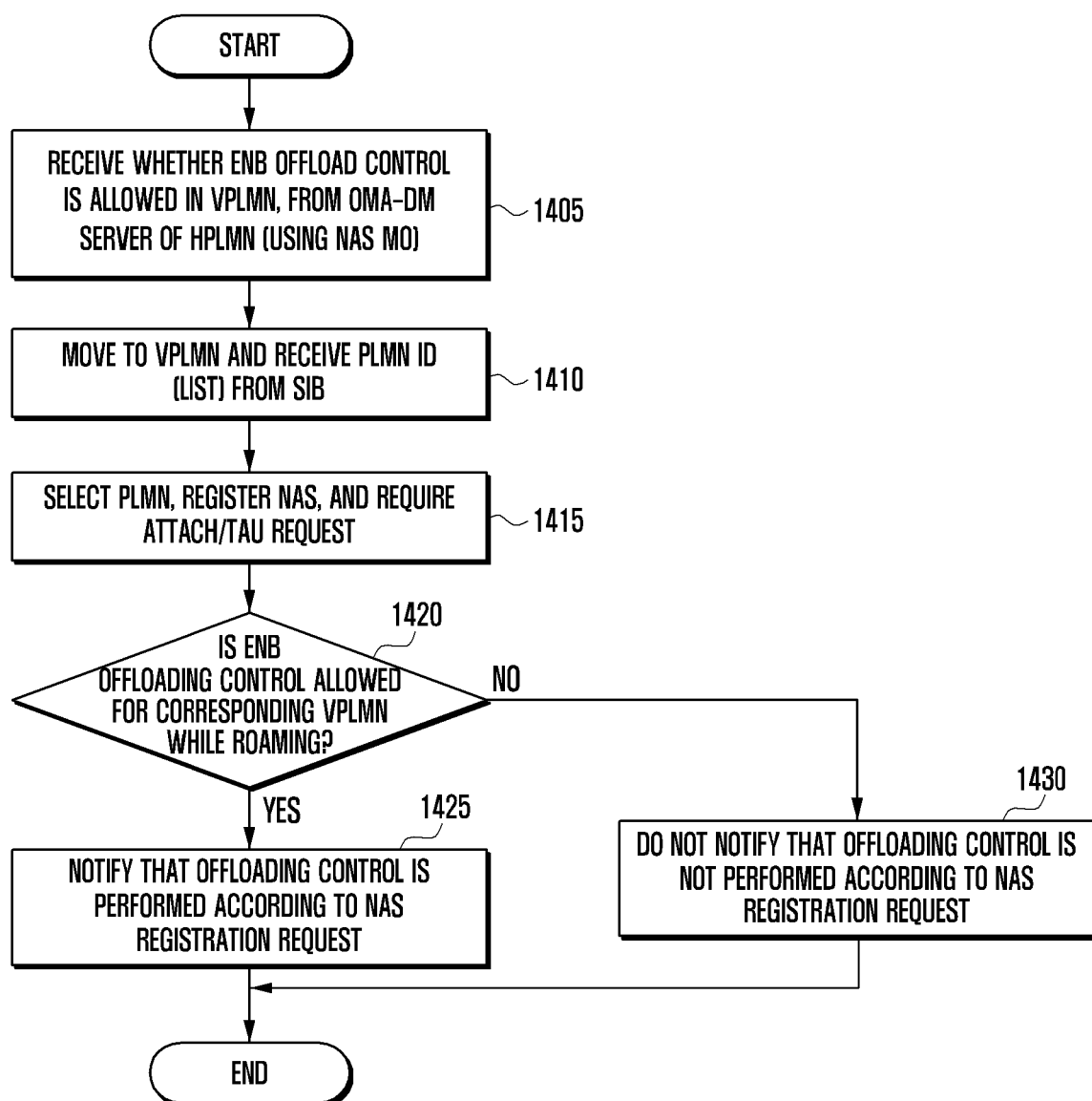
FIG. 14 is a flowchart illustrating an operation of a UE in detail according to an embodiment of the present invention.

FIG. 14 is a flowchart illustrating an operation of a UE in detail according to an embodiment. In more detail, FIG. 14 is a flowchart illustrating an operation of a UE according to the embodiment of FIG. 13.

Referring to FIG. 14, in operation 1405, a UE receives a policy indicating whether a VPLMN can be subjected to an offloading control of an eNB by an OMA-DM server of a Home network. The information can be expressed by adding a list of identifiers indicating whether an offloading control for each PLMN is allowed or not. Otherwise, the information can be expressed by adding an identifier indicating that a traffic offloading control for all VPLMNs is not allowed. That is, the policy can be configured for each PLMN or can be configured such that all VPLMNs are not subjected to an offloading control when a user is roaming. Otherwise, the policy may include only information indicating whether the UE allows use of WLAN traffic offloading control information provided by the eNB regardless of the PLMN or a roaming state. Further, the policy may be received from the OMA-DM server, or may be preset in the UE.

In operation 1410, when in the roaming state, the UE can identify which PLMN is provided by receiving an SIB from the eNB.

In operation 1415, the UE can select a PLMN according to a PLMN selection rule, and can determine whether a request for a NAS registration procedure is required or not.

In operation 1420, the UE can determine whether an eNB traffic offloading control is allowed or not, on the basis of the configured policy for the selected PLMN.

When the eNB traffic offloading control is allowed, in operation 1425, when sending a registration request (Attach/TAU request) to a core network node, the UE notifies that the UE allows a traffic offloading control of the eNB in the currently-selected PLMN.

When the traffic offloading control is not allowed, in operation 1430, the request message includes no information or explicitly includes the fact that the traffic offloading control is not supported.

The core network node can identify information on whether the traffic offloading control of the eNB is allowed or not, on the basis of information included in the message, store the information, and transmit the information when the UE is in a connection state or a context for the UE is installed in the eNB. The eNB can transmit a traffic offloading control message to the UE only when an identifier indicating that the UE allows the traffic offloading control of the eNB is included in the information received from the core network node.

The embodiment of FIG. 14 can be modified as follows when the WLAN traffic offloading control information is transmitted while being included in an SIB. The UE receives an SIB in operation 1414 and selects a PLMN in operation 1415. Thereafter, when offloading control information is received through an SIB, the UE determines whether an eNB offloading control in the selected PLMN is allowed or not, on the basis of the policy received in operation 1405 (or the policy preset in the UE). When the eNB offloading control is allowed, the UE can perform the traffic offloading using the offloading control information included in the SIB.

Figure 15:
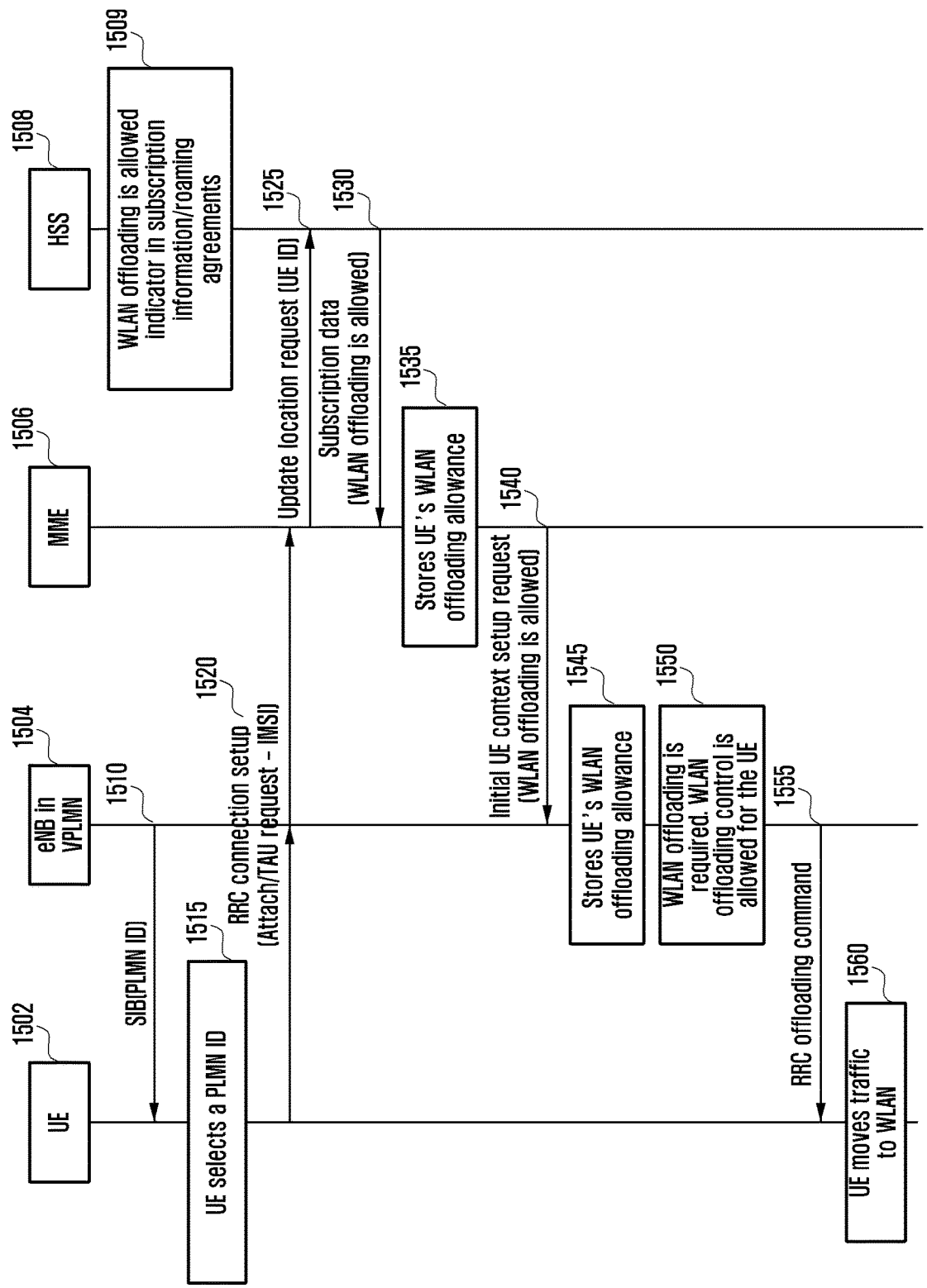
FIG. 15 is a signal flow diagram illustrating a process of determining whether off-loading is allowed to be controlled or not on the basis of subscription information according to an embodiment of the present invention.

FIG. 15 illustrates an embodiment of the present invention, in which whether a traffic offloading control is allowed or not is determined on the basis of subscription information.

Referring to FIG. 15, in operation 1510, a UE 1502 can receive, from a roaming eNB 1504, an SIB message including a PLMN ID of a network of the roaming eNB 1504.

In operation 1515, the UE 1502 can select a PLMN ID on the basis of the information received in operation 1510.

In operation 1520, a core network node (MME) 1506 of a VPLMN can receive a registration request (Attach/TAU request) from the UE 1502. The registration request may include an IMSI of the UE 1502. The core network node (MME) 1506 of the VPLMN can identify an HPLMN to which a user is subscribed, on the basis of an ID (IMSI) of the UE 1502.

In operation 1508, the core network node (MME) 1506 of the VPLMN transmits a subscription information request or a location registration message to a Home Subscriber Server (HSS) 1508 in order to receive subscription information from the HPLMN.

According to operation 1509, in the HSS 1509, whether the UE allows a traffic offloading control of an eNB in the VPLMN or not is configured (in one form of a roaming agreement between PLMNs or user subscription information).

In operation 1525, the MME 1506 can transmit, to the HSS 1508, a message for requesting subscription information. The message for requesting subscription information may be an update location request message, and the message may include a UE ID.

In operation 1530, when the subscription information is transferred according to a request of a core network, the HSS 1508 transmits together whether the traffic offloading control is allowed or not.

In operation 1535, the core network node 1506 can store the received information.

In operation 1540, the core network node 1506 transmits one or more pieces of the stored information to the roaming eNB 1504 when the UE is in a connected state or a context for the UE 1502 is installed in the eNB.

In operation 1545, the roaming eNB can store the information received in operation 1540.

In operation 1550, the roaming eNB 1504 can determine whether traffic offloading is needed or not. The roaming eNB 1504 can determine whether the traffic offloading command is ordered or not, on the basis of one or more of congestion of the eNB, a policy of a roaming provider, and a type of traffic.

In operation 1555, the roaming eNB 1504 can transmit a traffic offloading command to the UE 1502 on the basis of the determination result.

In operation 1560, the UE 1502 can perform the traffic offloading on the basis of the information received in operation 1555.

In an embodiment, the roaming eNB 1504 can transmit a traffic offloading control message to the UE when an identifier indicating that the UE allows the traffic offloading control of the eNB is included in the information received from the core network node.

The following method can be used as yet another alternative of the embodiment. A UE can transmit a registration request message (Attach request or TAU request) to an MME, and the MME, which has received the same, can determine whether the UE is allowed to be subjected to a traffic offloading control of an eNB or not, on the basis of the subscription information/roaming agreement information received from the HSS. Since the detailed operations are similar to operations 1510 to 1535, the detailed description will be omitted. The MME transmits an NAS registration acceptance message (Attach accept or TAU accept) to the UE on the basis of the information while the NAS registration acceptance message includes an identifier (e.g., RAN control for WLAN offloading is allowed IE) indicating whether WLAN traffic offloading control information provided by the eNB in a currently-registered network is used. The UE, which has received the same, stores the identifier, and then determines whether the WLAN traffic offloading control information received from the eNB is used or not. For example, when the received TAU accept message includes information that use of eNB control information for WLAN offloading is allowed, the UE can perform the WLAN traffic offloading using the traffic offloading control information which is included in the SIB message and transmitted by the eNB.

Figure 16:
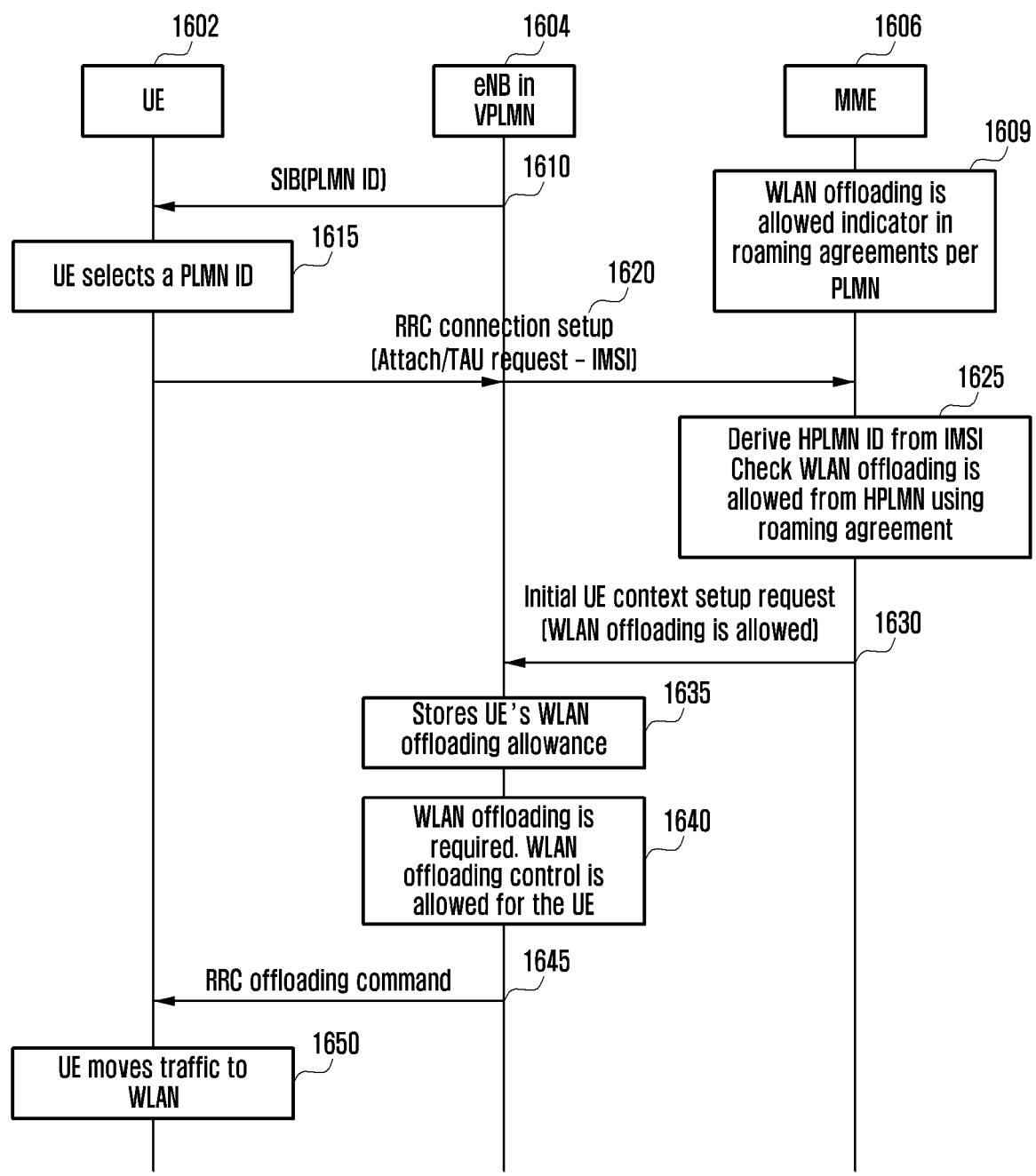
FIG. 16 is a signal flow diagram illustrating a process of determining whether off-loading is allowed to be controlled or not on the basis of MME configuration according to an embodiment of the present invention.

FIG. 16 illustrates an embodiment of the present invention, in which whether a traffic offloading control is allowed or not is determined on the basis of an MME configuration.

Referring to FIG. 16, in operation 1610, a UE 1602 can receive, from a roaming eNB 1604, an SIB message including a PLMN ID of a network of the roaming eNB 1604.

In operation 1615, the UE 1602 can select a PLMN ID on the basis of the information received in operation 1610.

In operation 1620, a core network node (MME) 1606 of a VPLMN can receive, from the UE 1602, a registration request (Attach/TAU request) including an ID (IMSI) of the UE 1602. The core network node 1606 of the VPLMN can identify an HPLMN, in which a user is registered, on the basis of the ID (IMSI) of the UE. Referring to operation 1609, the core network node 1606 of the VPLMN may store an identifier relating to a roaming agreement with the predetermined HPMN. In an embodiment, the core network node 1606 may be an MME, and such predetermined information may be configured by a policy which is local to the MME 1606.

In operation 1625, the core network node 1606 of the VPLMN can determine whether the UE 1602 allows a traffic offloading control of an eNB 1604 in the VPLMN or not, on the basis of the information stored in operation 1609.

In operation 1630, the core network node 1606 of the VPLMN transmits Initial UE context setup request message including whether WLAN offloading is allowed, when the UE 1602 is in a connection state or a context for the UE 1602 is installed in the roaming eNB 1604.

In operation 1635, the roaming eNB can store the information received in operation 1630.

In operation 1640, the roaming eNB 1604 can determine whether traffic offloading is needed or not. The roaming eNB 1604 can determine whether the traffic offloading command is ordered or not, on the basis of one or more of congestion of the eNB, a policy of a roaming provider, and a type of traffic.

In operation 1645, the roaming eNB 1604 can transmit a traffic offloading command to the UE 1602 on the basis of the determination result.

In operation 1650, the UE 1602 can perform the traffic offloading on the basis of the information received in operation 1645.

In an embodiment, the roaming eNB 1604 can transmit a traffic offloading control message to the UE when an identifier indicating that the UE allows the traffic offloading control of the eNB is included in the information received from the core network node 1606.

The following method can be used as yet another alternative of the embodiment. A UE can transmit a registration request message (Attach request or TAU request) to an MME, and the MME, which has received the same, can determine whether the UE is allowed to be subjected to a traffic offloading control of an eNB or not, on the basis of the predetermined information. Since the detailed operations are similar to operations 1610 to 1625, the detailed description will be omitted. The MME transmits an NAS registration acceptance message (Attach accept or TAU accept) to the UE on the basis of the information while the NAS registration acceptance message includes an identifier (e.g., RAN control for WLAN offloading is allowed IE) indicating whether WLAN traffic offloading control information provided by the eNB in a currently-registered network is used. The UE, which has received the same, stores the identifier, and then determines whether the WLAN traffic offloading control information received from the eNB is used or not. For example, when the received TAU accept message includes information that use of eNB control information for WLAN offloading is allowed, the UE can perform the WLAN traffic offloading using the traffic offloading control information which is included in the SIB message and transmitted by the eNB.

Meanwhile, although it is exemplified in the description of the embodiments disclosed through FIGS. 9 to 16 that the basis on which the UE determines whether the traffic offloading control information provided by the eNB is applied or not is a case where the roaming state (PLMN) is used, the embodiments of the present invention can be applied even in a case of not a specific PLMN or not a roaming situation. In more detail, whether use of traffic offloading control information provided by the eNB through manual configuration information, an ANDSF policy, an NAS MO, or an NAS response message regardless of the PLMN is allowed to the UE is configured, and only when the use is allowed, the UE can use a traffic offloading policy provided by the eNB regardless of the PLMN.

Meanwhile, in the embodiments described using at least one of FIGS. 13, 14, 15, and 16, for the convenience of description, disclosed is a method of transferring information on whether offloading for the UE is allowed or not (including at least one of whether offloading for a bearer is allowed or not and whether offloading for an APN is allowed or not) to the UE through the eNB by the MME. However, the embodiments of the present specification may include transferring information on whether offloading is allowed or not, to the UE, using an NAS message by the MME.

For example, in an embodiment, the MME can transmit an EPS bearer context provided to the UE while the EPS bearer context includes information on whether the corresponding bearer can be offloaded to WLAN. In more detail, the MME can insert information including whether a target EPS bearer is allowed to be offloaded, into an EPS QoS ID included in an EPS Session Management (ESM) message, e.g., an Activate Default/Dedicated EPS Bearer Context Request message, etc. The information included in the EPS QoS IE is used to notify, to the UE, whether each EPS bearer is allowed to be offloaded. Otherwise, the MME can insert an IE indicating whether offloading is allowed or not, into an Activate Default EPS bearer Context Request message to be transmitted to the UE. When the UE receives the Activate Default EPS bearer Context Request message, the UE can equally apply whether offloading is allowed, to an EPS bearer belonging to the same PND connection as that of a default EPS bearer, i.e., a linked EPS bearer. Otherwise, the MME can notify information on whether offloading is allowed for each APN for the UE or not using the NAS message. Further, when the UE receives whether offloading is allowed or not from the MME and receives WLAN access information from the eNB, the UE can finally select traffic, a bearer, or the like to be offloaded to WLAN using the two pieces of information. That is, the UE can identify whether offloading to WLAN of a PDN connection is allowed or not, through the received ESM message. Further, the ESM messages may include whether WLAN offloading in a RAT (in the present embodiment, an E-UTRAN) which the UE accesses is allowed or not as well as whether WLAN offloading in another RAT (e.g., a UTRAN) is allowed or not. When the UE moves from a RAT currently being accessed (or camped on an idle state) to another RAT and does not explicitly receive, from a core network (MME or SGSN), whether WLAN offloading for a PDN connection in the changed RAT is allowed or not, the UE can determine whether WLAN offloading is allowed or not using the information received and stored in advance.

Meanwhile, the eNB can provide, to the UE, information used for selecting a WLAN to access by the UE or selecting traffic to be offloaded to a WLAN. The information can be transmitted to the UE through at least one of a unicast message, a multicast message and a broadcast message. In more detail, the eNB can transmit the information to the UE and the eNB using a unicast RRC message or can be transmitted to a plurality of UEs using a broadcast message such as the SIB.

Figure 17:
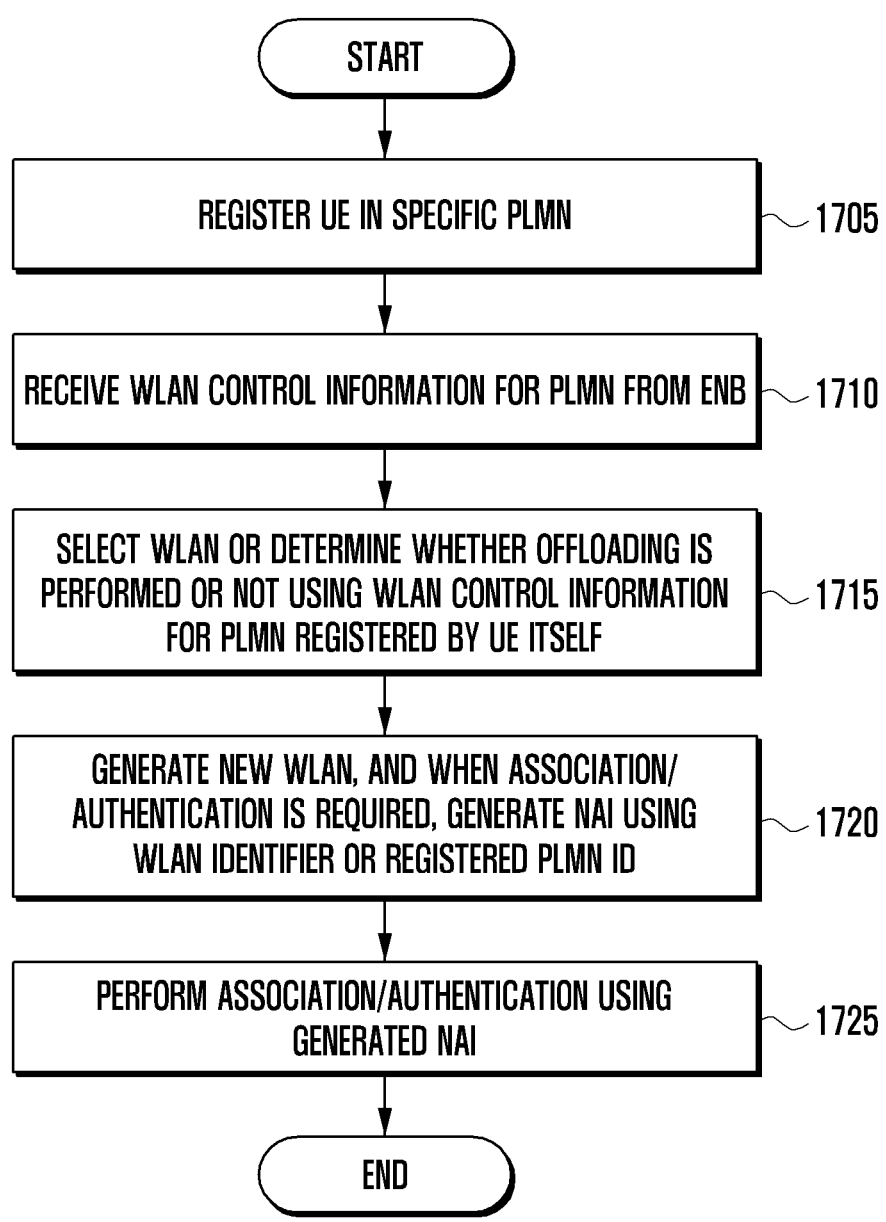
FIG. 17 is a flowchart illustrating a process of attempting access using WLAN control information for a registered PLMN by a UE itself when the WLAN control information is transferred to the UE using a broadcasting method, in an RAN-shared environment.

FIG. 17 is a flowchart illustrating a process of attempting access using WLAN control information for a registered PLMN by a UE itself when the WLAN control information is transferred to the UE using a broadcasting method, in a RAN-shared environment.

Referring to FIG. 17, in operation 1705, the UE can perform a registration procedure for a specific PLMN. In a RAN sharing environment in which an ENB is shared by a plurality of PLMNs, the UE is registered to one PLMN among the PLMNs which share a RAN. The PLMN in which the UE is registered may be called a Registered PLMN (RPLMN). Further, in an embodiment, various PLMNs registered to one eNB can have different PLMN IDs.

In operation 1710, the UE can receive, from an eNB, WLAN control information for each PLMN relating to the eNB. In an embodiment, the WLAN control information may include WLAN information relating to a PLMN and may be called WLAN related information. In more detail, in an embodiment, when the eNB provides the WLAN related information to the UE using a broadcast message, the WLAN related information can be transmitted while being differently configured for each PLMN. That is, The WLAN related information broadcasted the eNB may be configured by the following information.

<a PLMN ID (or an index indicating a specific PLMN on a PLMN ID list), WLAN identifier list, traffic offloading control information, a threshold value of the intensity of a signal of WLAN or an eNB, and the like>.

Further, the WLAN related information may include a list of service provider IDs corresponding to each PLMN, and such information may be selectively included in the WLAN related information. Further, the WLAN related information may include a list of preferred roaming partners according to a roaming allowance contract for each PLMN, and such information may be selectively included in the WLAN related information. The service provider or the roaming partner ID may have a form of a realm or a FQDN, and the lists may be configured to have a priority for each service provide or each roaming partner.

In operation 1715, the UE can select a WLAN relating to the registered PLMN or determine whether traffic offloading is allowed or not, on the basis of the received WLAN control information. In an embodiment, when the UE receives the WLAN information from the eNB while receiving a service in a RAN shared network, the UE can select a WLAN or determine whether traffic offloading is allowed or not, using the WLAN information corresponding to the RPLMN in which the UE itself is registered. Further, in an embodiment, the UE can determine whether traffic offloading for the selected WLAN is allowed or not. Further, the UE can select a WLAN corresponding to a PLMN related to the UE on the basis of the received WLAN information.

In an embodiment, the WLAN related information may include various pieces of information. First, the WLAN related information may include lists of an identifier of WLAN which the UE can access, service providers of WLAN, or preferred roaming partners. The identifier of the WLAN corresponds to an ID, such as an SSID and an ESSID, indicating the WLAN. In the lists of WLAN, service providers or preferred roaming partners, a priority for each of identifiers included in the lists can be determined, and the UE, which has received the priority, can preferentially select and access at least one identifier matched with a WLAN having an identifier having the highest priority in the list from among WLANs detected (scanned) by the UE. In the matching process, the UE can identify identifiers of a WLAN or a service provider using information (e.g., a beacon, a probe response, an ANQP response, etc.) transmitted by the WLAN.

In operation 1720, when accessing the WLAN, the UE can attempt association and authentication. In an embodiment, when attempting association and authentication by selecting a WLAN, the UE generates a Network Access Identifier (NAI) and includes the NAI in a request message for attempting the association and the authentication. In an embodiment, when information by which the NAI can be configured is included in an identifier of a WLAN selected by the UE itself, for example, when a service provider or a roaming partner ID is used, the NAI can be generated using the entirety or a part of the information included in the identifier. When the NAI cannot be generated by the WLAN identifier, for example, when the WLAN identifier is a SSID or the SSID does not include information indicating a provider, the UE can generate the NAI using a PLMN (RPLMN) ID in which the UE itself is registered. Further, in an embodiment, even when a new WLAN is not selected, in operation 1725, the UE can perform association and authentication for a specific WLAN using the generated NAI.

When the information provided by the eNB does not include a list of the WLAN identifiers, the service provider identifiers, or the preferred roaming partner identifiers, the UE may preferentially access a WLAN belonging to the PLMN (RPLMN) in which the UE itself registered, or may not use a WLAN not belonging to the RPLMN.

What is claimed is:

1. A method performed by a terminal in a wireless communication system, the method comprising:
    receiving, from a base station, system information including configuration information for a traffic offload associated with a public land mobile network (PLMN);
    transmitting, to a core network entity, a first message for a packet data network (PDN) connection;
    receiving, from the core network entity, a second message including an indication which indicates whether the traffic offload associated with the PDN connection using a first communication system and a second communication system is allowed; and
    determining whether the traffic offload is allowed to the PDN connection based on the indication,
    wherein the first communication system corresponds to a $3^{rd}$ generation partnership project (3GPP) communication system,
    wherein the second communication system corresponds to a non-3GPP communication system,
    wherein the configuration information for the traffic offload associated with the PLMN includes a PLMN identity and a threshold value corresponding to the PLMN identity for the traffic offload, and
    wherein the traffic offload is determined based on the indication and the threshold value included in the configuration information for the traffic offload.

2. The method of claim 1,
    wherein the first message includes identification information of the terminal,
    wherein the indication comprises information indicating an offloadability per access point name (APN) basis or a PDN connection basis, and
    wherein the first message and the second message correspond to non-access stratum (NAS) message.

3. A method performed by a core network entity in a wireless communication system, the method comprising:
    receiving, from a terminal, a first message for a packet data network (PDN) connection;
    determining an indication indicating whether a traffic offload associated with the PDN connection using a first communication system and a second communication system is allowed; and
    transmitting, to the terminal, a second message including the indication,
    wherein the indication is determined based on subscription information for the terminal,
    wherein the first communication system corresponds to a $3^{rd}$ generation partnership project (3GPP) communication system,
    wherein the second communication system corresponds to a non-3GPP communication system,
    wherein system information includes configuration information for the traffic offload associated with a public land mobile network (PLMN),
    wherein the configuration information for the traffic offload associated with the PLMN includes a PLMN identity and a threshold value corresponding to the PLMN identity for the traffic offload, and
    wherein the traffic offload is determined based on the indication and the threshold value included in the configuration information for the traffic offload.

4. The method of claim 3,
    wherein the first message includes identification information of the terminal,
    wherein the indication comprises information indicating an offloadability per access point name (APN) basis or a PDN connection basis, and
    wherein the first message and the second message correspond to non-access stratum (NAS) message.

5. A terminal in a wireless communication system, the terminal comprising:
    a transceiver; and
    a controller configured to:
        receive, from a base station via the transceiver, system information including configuration information for a traffic offload associated with a public land mobile network (PLMN),
        transmit, to a core network entity via the transceiver, a first message for a packet data network (PDN) connection,
        receive, from the core network entity via the transceiver, a second message including an indication which indicates whether the traffic offload associated with the PDN connection using a first communication system and a second communication system is allowed, and
        determine whether the traffic offload is allowed to the PDN connection based on the indication,
    wherein the indication is determined based on subscription information for the terminal,
    wherein the first communication system corresponds to a $3^{rd}$ generation partnership project (3GPP) communication system,
    wherein the second communication system corresponds to a non-3GPP communication system,
    wherein the configuration information for the traffic offload associated with the PLMN includes a PLMN identity and a threshold value corresponding to the PLMN identity for the traffic offload, and
    wherein the traffic offload is determined based on the indication and the threshold value included in the configuration information for the traffic offload.

6. The terminal of claim 5
    wherein the first message includes identification information of the terminal,
    wherein the indication comprises information indicating an offloadability per access point name (APN) basis or a PDN connection basis, and
    wherein the first message and the second message correspond to non-access stratum (NAS) message.

7. A core network entity in a wireless communication system, the core network entity comprising:
    a transceiver; and
    a controller configured to:

receive, from a terminal via the transceiver, a first message for a packet data network (PDN) connection, determine an indication indicating whether a traffic offload associated with the PDN connection using a first communication system and a second communication system is allowed, and transmit, to the terminal via the transceiver, a second message including the indication, wherein the indication is determined based on subscription information for the terminal, wherein the first communication system corresponds to a $3^{rd}$ generation partnership project (3GPP) communication system, wherein the second communication system corresponds to a non-3GPP communication system, wherein system information includes configuration information for the traffic offload associated with a public land mobile network (PLMN), wherein the configuration information for the traffic offload associated with the PLMN includes a PLMN identity and a threshold value corresponding to the PLMN identity for the traffic offload, and wherein the traffic offload is determined based on the indication and the threshold value included in the configuration information for the traffic offload.

8. The core network entity of claim 7, wherein the first message includes identification information of the terminal, wherein the indication comprises information indicating an offloadability per access point name (APN) basis or a PDN connection basis, and wherein the first message and the second message correspond to non-access stratum (NAS) message.

9. The method of claim 1, wherein the indication is determined based on at least one of subscription information for the terminal or a locally configured policy.

10. The method of claim 3, wherein the indication is determined based on at least one of subscription information for the terminal or a locally configured policy.

11. The terminal of claim 5, wherein the indication is determined based on at least one of subscription information for the terminal or a locally configured policy.

12. The core network entity of claim 7, wherein the indication is determined based on at least one of subscription information for the terminal or a locally configured policy.

* * * * *